(12) United States Patent
Matsuyama

(10) Patent No.: US 12,468,478 B2
(45) Date of Patent: Nov. 11, 2025

(54) DISK DEVICE AND COMMAND MANAGEMENT METHOD

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Kazunori Matsuyama, Yokohama Kanagawa (JP)

(73) Assignees: Kabushiki Kaisha Toshiba, Kawasaki (JP); Toshiba Electronic Devices & Storage Corporation, Kawasaki (JP)

( * ) Notice: Subject to any disclaimer, the term of this patent is extended or adjusted under 35 U.S.C. 154(b) by 94 days.

(21) Appl. No.: 18/582,287

(22) Filed: Feb. 20, 2024

(65) Prior Publication Data

US 2025/0077112 A1 Mar. 6, 2025

(30) Foreign Application Priority Data

Sep. 5, 2023 (JP) .................................. 2023-143619

(51) Int. Cl.
*G06F 3/06* (2006.01)
(52) U.S. Cl.
CPC .......... *G06F 3/0655* (2013.01); *G06F 3/0604* (2013.01); *G06F 3/0676* (2013.01)

(58) Field of Classification Search
CPC .... G06F 3/0604; G06F 3/0655; G06F 3/0659; G06F 3/0676; G06F 16/211; G06F 16/2246; G06F 16/23
USPC .................................................. 711/111, 103
See application file for complete search history.

(56) References Cited

U.S. PATENT DOCUMENTS

| | | | |
|---|---|---|---|
| 2005/0193160 A1* | 9/2005 | Bhatt | G06F 12/12 711/3 |
| 2016/0335299 A1* | 11/2016 | Vemulapati | G06F 16/2246 |
| 2017/0242790 A1* | 8/2017 | O'Krafka | G06F 3/0652 |
| 2018/0275876 A1 | 9/2018 | Nakashima et al. | |

FOREIGN PATENT DOCUMENTS

JP 2018-159993 10/2018

\* cited by examiner

*Primary Examiner* — Hashem Farrokh
(74) *Attorney, Agent, or Firm* — Knobbe, Martens, Olson & Bear, LLP

(57) ABSTRACT

According to one embodiment, there is provided a disk device including a disk medium, a memory and a controller. On the disk medium, data is recorded according to an address. The controller generates or updates a database and stores the database in the memory as a command including the address is received. The database is associated with address ranges of commands, and includes a tree-like array in accordance with command addresses and time series. The controller manages commands using the database.

20 Claims, 20 Drawing Sheets

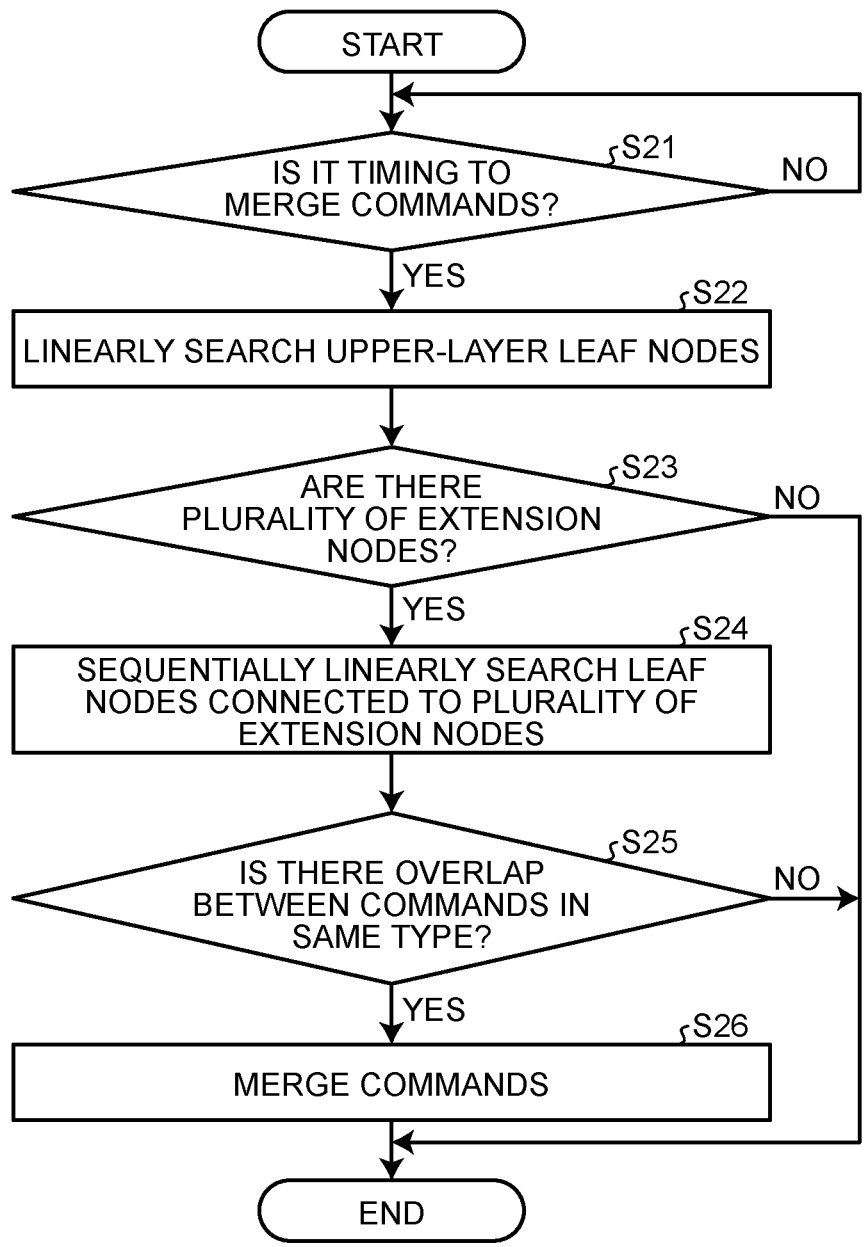

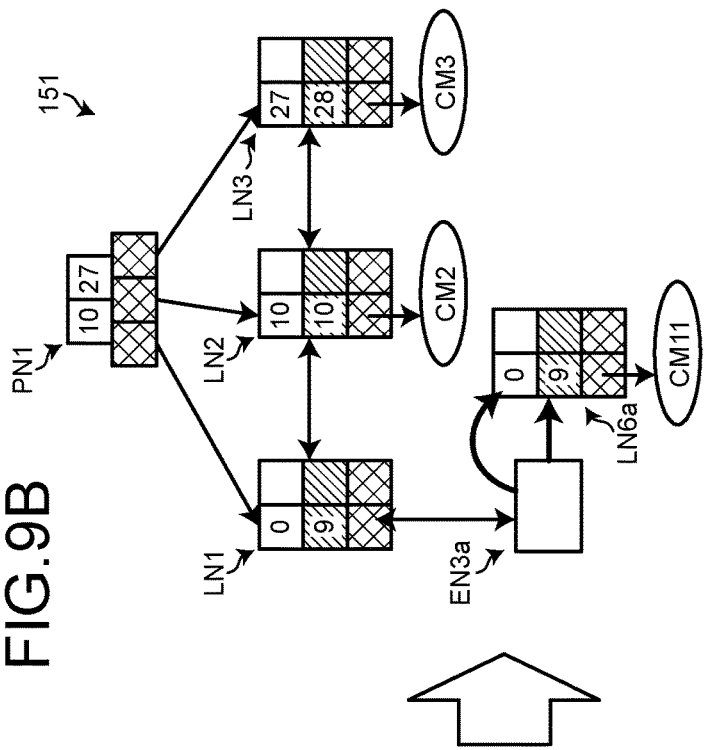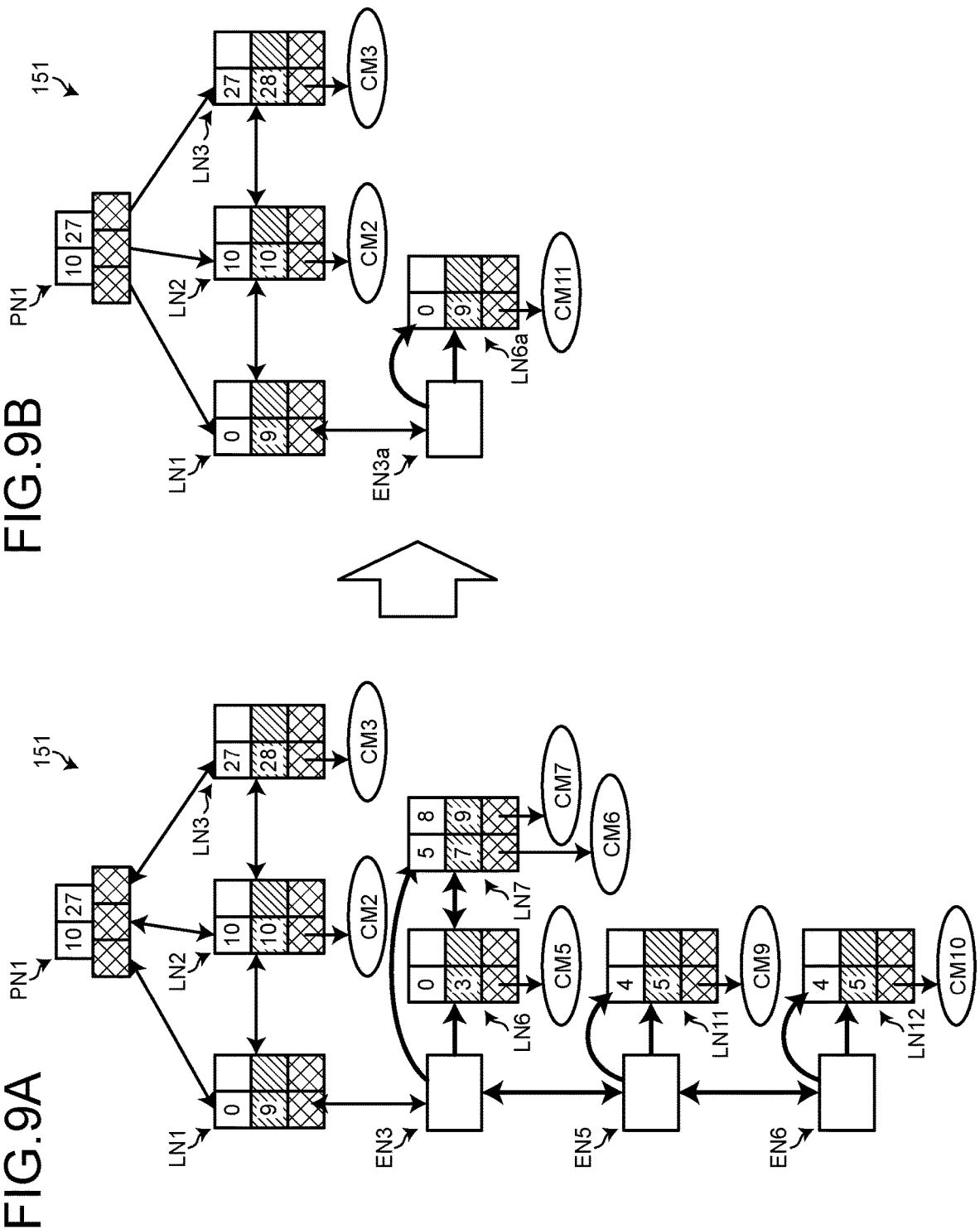
FIG.9B
FIG.9A

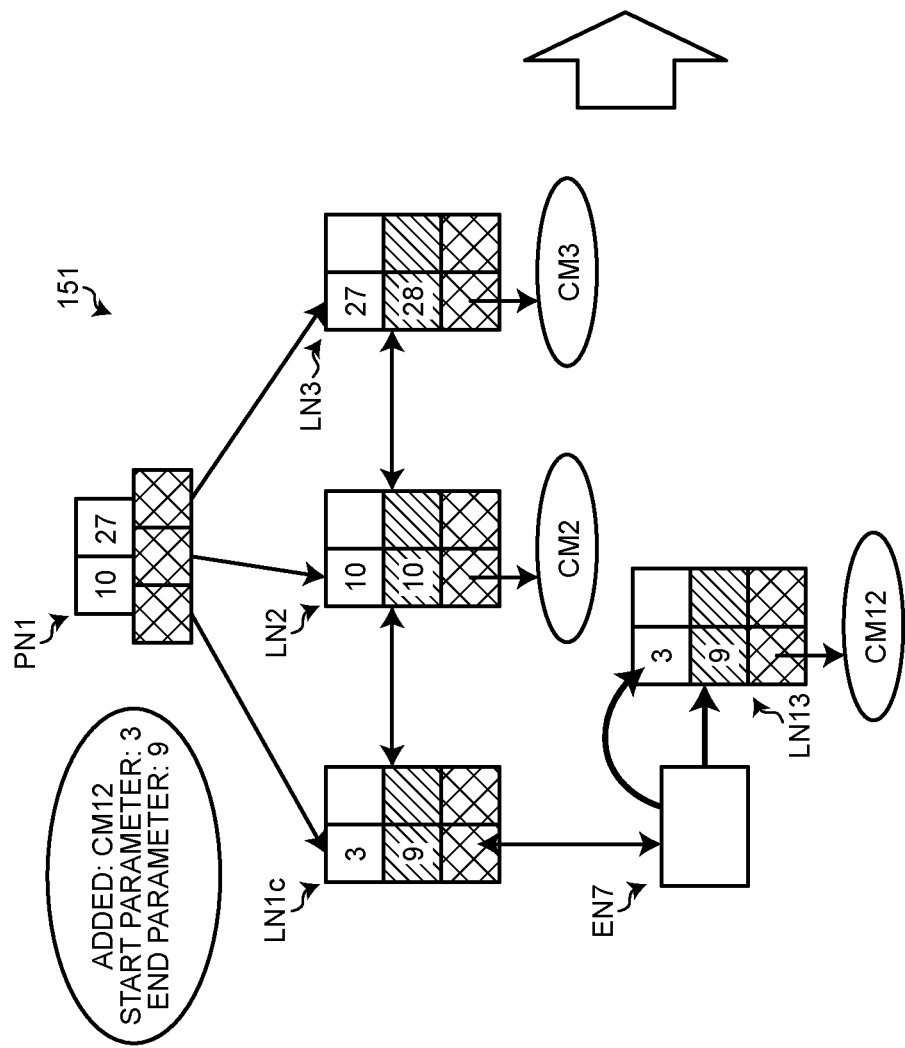

DISK DEVICE AND COMMAND MANAGEMENT METHOD

CROSS-REFERENCE TO RELATED APPLICATIONS

This application is based upon and claims the benefit of priority from Japanese Patent Application No. 2023-143619, filed on Sep. 5, 2023; the entire contents of which are incorporated herein by reference.

FIELD

Embodiments described herein relate generally to a disk device and a command management method.

BACKGROUND

A disk device connectable to a host may receive a command from the host. In the disk device, it is desirable to efficiently manage the received command.

BRIEF DESCRIPTION OF THE DRAWINGS

FIG. 8 is a flowchart illustrating an operation when commands are merged according to the embodiment;

FIGS. 9A and 9B are diagrams illustrating an operation of a database when commands are merged according to the embodiment;

FIGS. 12A and 12B are diagrams illustrating an operation of a database when a command is executed according to the embodiment;

DETAILED DESCRIPTION

In general, according to one embodiment, there is provided a disk device including a disk medium, a memory and a controller. On the disk medium, data is recorded according to an address. The controller generates or updates a database and stores the database in the memory as a command including the address is received. The database is associated with address ranges of commands, and includes a tree-like array in accordance with command addresses and time series. The controller manages commands using the database.

Exemplary embodiments of a disk device will be explained below in detail with reference to the accompanying drawings. The present invention is not limited to the following embodiments.

Embodiments

A disk device according to an embodiment has an interface that can be connected to a host and is provided to efficiently manage commands received from the host through the interface.

Figure 1:
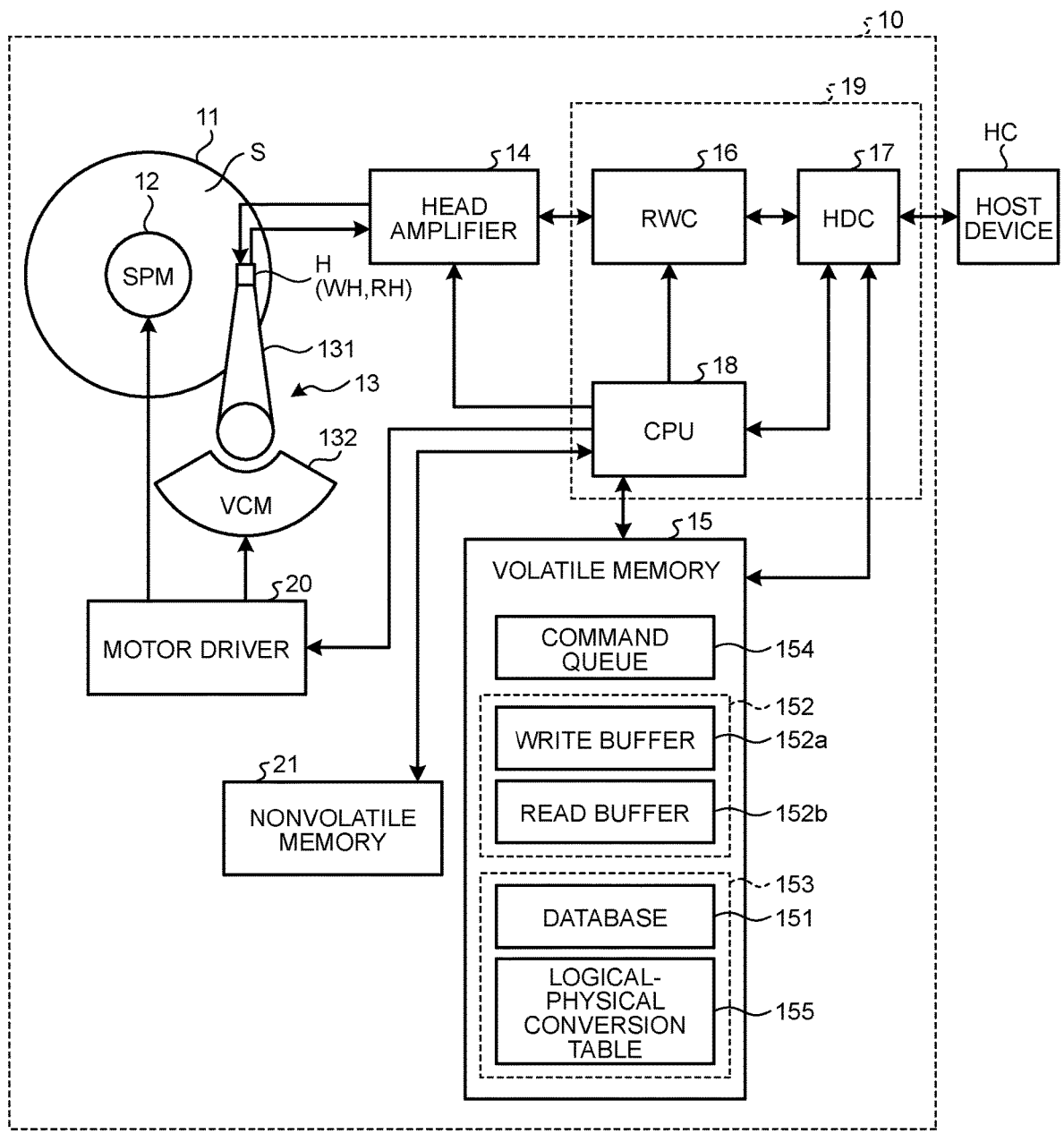
FIG. 1 is a diagram illustrating a hardware configuration of a disk device according to an embodiment.

As illustrated in FIG. 1, a disk device 10 includes a disk medium 11, a spindle motor 12, a head stack assembly (HSA) 13, a head amplifier 14, a volatile memory 15, a read/write channel (RWC) 16, a hard disk controller (HDC) 17, a central processing unit (CPU) 18, a motor driver 20, and a nonvolatile memory 21. FIG. 1 is a diagram illustrating a configuration of the disk device 10.

The disk medium 11 has recording surfaces S on which data is recorded on a front surface and a back surface, respectively, thereof. The disk medium 11 is rotationally driven by a spindle motor 12. A plurality of disk media 11 is provided in the disk device 10. Physical addresses that are position information indicating physical positions on the recording surfaces S are set for all the recording surfaces S used in the disk device 10. The spindle motor 12 is driven by a current (or a voltage) supplied from the motor driver 20.

The HSA 13 includes a head H, a head suspension 131, and a voice coil motor (VCM) 132. The head H is provided for each recording surface S of the disk medium 11. The head H includes a write head WH and a read head RH. The write head WH is used for writing data to the disk medium 11. The read head RH is used for reading data from the disk medium 11.

The head suspension 131 supports the head H, and is provided for each head H. The VCM 132 is driven by a current (or a voltage) supplied from the motor driver 20. The head suspension 131 and the VCM 132 constitute an actuator. The actuator controls a movement of the head H supported by the head suspension 131 to a predetermined position on the recording surface S of the disk medium 11 by driving the VCM 132. With such a configuration of the HSA 13, the head H can move in a radial direction of the recording surface S of the disk medium 11.

The motor driver 20 supplies a current or a voltage to the spindle motor 12 to drive the spindle motor 12 at a predetermined rotation speed. In addition, the motor driver 20 drives the actuator by supplying a current or a voltage designated by the CPU 18 to the VCM 132.

The head amplifier 14 causes a write signal (a current) corresponding to write data input from the RWC 16 to flow to the head H. In addition, the head amplifier 14 amplifies a read signal output from the head H (read data read from the disk medium 11 by the head H) and supplies the amplified read signal to the RWC 16.

The RWC 16 is a signal processing circuit. The RWC 16 encodes (code-modulates) write data input from the HDC 17 and outputs the encoded data to the head amplifier 14. In addition, the RWC 16 decodes (code-demodulates) read data from a read signal transmitted from the head amplifier 14, and outputs the decoded data to the HDC 17.

The HDC 17 controls transmission and reception of data to and from a host device HC via an I/F bus. The HDC 17 includes a host interface (host I/F) circuit that is not illustrated.

The CPU 18 performs an overall control of the disk device 10 according to firmware stored in the nonvolatile memory 21 or the disk medium 11. For example, the CPU 18 executes various control processes such as a process of controlling a read or a write of the head H and a servo control process for controlling a position of a head on the recording surface S of the disk medium 11. The firmware includes initial firmware that is first executed when the disk device 10 is started and control firmware used for a normal operation of the disk device 10.

Note that a hardware configuration including the RWC 16, the HDC 17, and the CPU 18 can also be regarded as a controller 19. The controller 19 can be configured as a one-chip integrated circuit (a system-on-chip). The package of the controller 19 may be disposed on a printed circuit board outside a case (not illustrated) that houses the disk medium 11, the spindle motor 12, and the HSA 13.

The nonvolatile memory 18 is connected to the CPU 18 of the controller 19, and is rewritable by the CPU 18.

The volatile memory 15 includes a volatile memory such as a dynamic RAM (DRAM) or a static RAM (SRAM). The volatile memory 15 includes a command queue 154, a buffer 152, and a working area 153. The working area 153 is used by the controller 19 to temporarily store data and the like. For example, the CPU 18 reads a database 151 and a logical-physical conversion table 155 via the head H, the head amplifier 14, the RWC 16, and the HDC 17, and stores the database 151 and the logical-physical conversion table 155 in the working area 153.

The command queue 154 queues a plurality of commands received by the HDC 17 in the order in which they are received. Each of the plurality of commands includes a logical address for accessing the disk medium 11. The command queue 154 is a queue buffer, and commands are dequeued in the order in which they are enqueued. That is, the command queue 154 has a FIFO structure.

The buffer 152 includes a write buffer 152a and a read buffer 152b. The write buffer 152a temporarily stores data to be written to the disk medium 11 according to a command (e.g., a write command) for instructing writing of write data to the disk medium 11. The read buffer 152b temporarily stores data read from the disk medium 11 according to a command (e.g., a read command) for instructing reading of read data from the disk medium 11.

The write command includes a head logical block address (LBA) of a logical sector to which write data is to be written among the logical sectors managed by the disk device 10 and a write data length. In addition, the read command includes s head LBA of a logical sector in which read data to be read among the logical sectors managed by the disk device 10 is stored and a read data length. The LBA is also referred to as a logical address.

The logical-physical conversion table 155 in the working area 153 is information in which logical addresses and physical addresses are associated with each other, and can be fixedly used without being rewritten in the normal state. Therefore, in the disk device 10, when logical addresses of a plurality of commands are consecutive, it can be estimated that physical addresses accessed by the plurality of commands are also consecutive. Here, the physical address includes, for example, a combination of a cylinder number and a sector number. The cylinder number is a number for identifying a cylinder. The cylinder is a unit of a storage area straddling a plurality of tracks corresponding to upper and lower ones of the plurality of disk media 11. The sector number is a number for identifying a sector position in one track. That is, the physical addresses are consecutively allocated to some information within each track and to a plurality of adjacent tracks on the disk medium 11, respectively. Note that the physical addresses include head numbers (recording surface numbers), and can be consecutively assigned to a plurality of tracks adjacent to each other in the vertical direction in the cylinder.

When executing a command, the controller 19 performs a logical-physical conversion process for converting a logical address included in the command into a physical address, referring to the logical-physical conversion table 155. The controller 19 executes the command using the physical address, and accesses the disk medium 11. Note that, in the following description, an LBA included in the command will be simply referred to as an address for the sake of simplification, because a process before the logical-physical conversion process will be mainly targeted.

As a command including an address is received, the controller 19 may generate a database 151 and store the database 151 in the working area 153 of the volatile memory 15.

The database 151 in the working area 153 is information for managing a plurality of commands received by the HDC 17. The generation of the database 151 may refer to functionally forming a data structure in the working area 153 for a plurality of commands, the data structure being associated with address ranges of the commands and including a tree-like array in accordance with command addresses and time series.

The controller 19 manages commands using the database 151. As a command is received, the controller 19 changes (for example, enqueues) the command queued in the command queue 154, and updates the database 151 accordingly. The controller 19 may add information on the received command to the database 151. As a command is to be executed, the controller 19 changes (for example, dequeues) the command queued in the command queue 154, selects the command from the database 151 and executes the command, and updates the database 151 accordingly. The controller 19 may delete information on the command to be executed from the database 151. Hereinafter, for the sake of simplicity, the description of the operation of the command queue 154 will be omitted.

Figure 2:
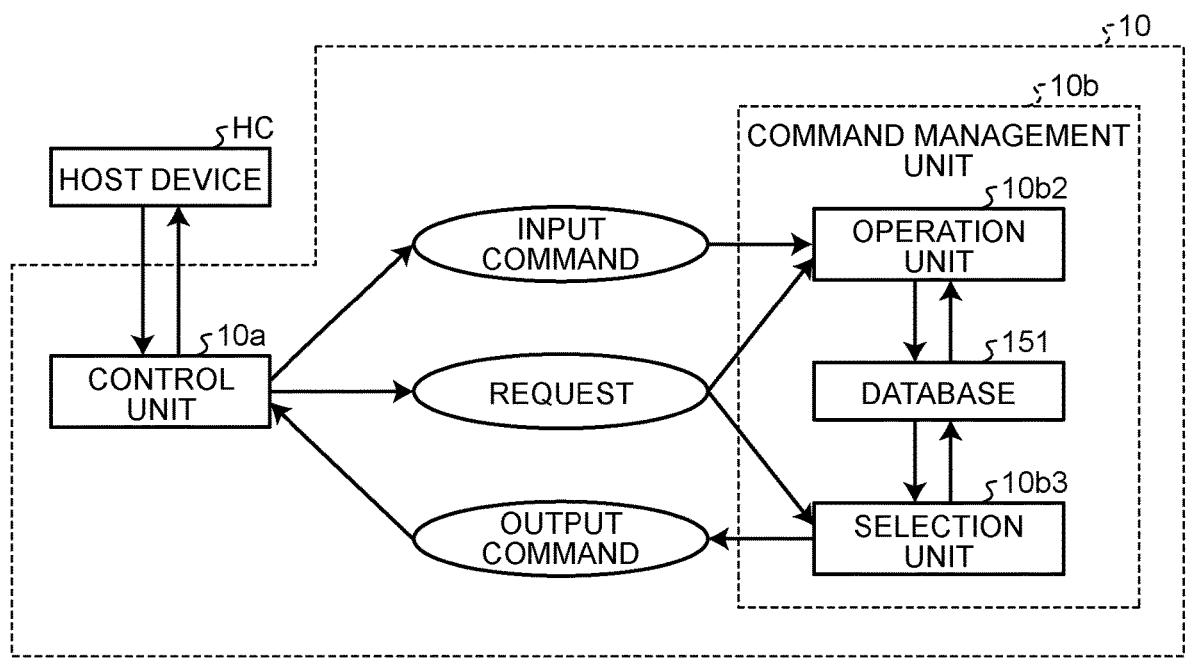
FIG. 2 is a diagram illustrating a functional configuration of the disk device according to the embodiment.

The controller 19 may construct a functional configuration illustrated in FIG. 2 in the disk device 10. FIG. 2 is a diagram illustrating a functional configuration of the disk device 10.

The disk device 10 functionally includes a control unit 10a and a command management unit 10b. The command management unit 10b includes a database 151, an operation unit 10b2, and a selection unit 10b3. The control unit 10a and the command management unit 10b may be functionally configured to be developed in the volatile memory 15 collectively at the time of compilation or sequentially in accordance with the progress of processing by execution of firmware by the controller 19.

The control unit 10a functions as an interface with respect to the host device HC, and controls the command management unit 10b2.

The control unit 10a can receive a command from the host device HC. When receiving a command from the host device HC, the control unit 10a supplies the command to the command management unit 10b2 as an input command, together with a request issued to request the command management unit 10b2 to add the command.

When a condition for executing a command is satisfied, the control unit 10a issues a request for selecting a command to be executed and supplies the request to the command management unit 10b2.

When receiving the selected command as an output command from the command management unit 10b2, the control unit 10a makes the command executable. The control unit 10a executes the command at a predetermined timing.

When the execution of the command is completed, the control unit 10a returns a response to the command to the host device HC.

The database 151 is information for managing a plurality of commands received from the host device HC by the control unit 10a. The database 151 is associated with address ranges of commands for a plurality of commands and is arrayed in a tree shape according to command addresses and time series.

The operation unit 10b2 receives an input command and a request from the control unit 10a. The input command is a command received from the host device HC by the control unit 10a. The request is a request related to an operation of the database 151, and is issued by the control unit 10a according to the command.

The operation unit 10b2 operates the database 151 according to the input command and the request. The operation unit 10b2 may update the database 151 by adding the command to the database 151 according to the input command and the request.

The selection unit 10b3 receives a request from the control unit 10a. The request is a request related to a selection of a command from the database 151, and is issued by the control unit 10a as a condition for executing the command is satisfied.

The selection unit 10b3 searches the database 151 according to the request. The selection unit 10b3 can select a command from the database 151 according to the request. The selection unit 10b3 supplies the selected command to the control unit 10a as an output command. Accordingly, the control unit 10a executes the command.

The selection unit 10b3 notifies the control unit 10a of information on the selected command. The control unit 10a issues a request for deleting the command according to the information on the selected command and supplies the request to the operation unit 10b2. The operation unit 10b2 may delete the command from the database 151 according to the request, and update the database 151.

Figure 3:
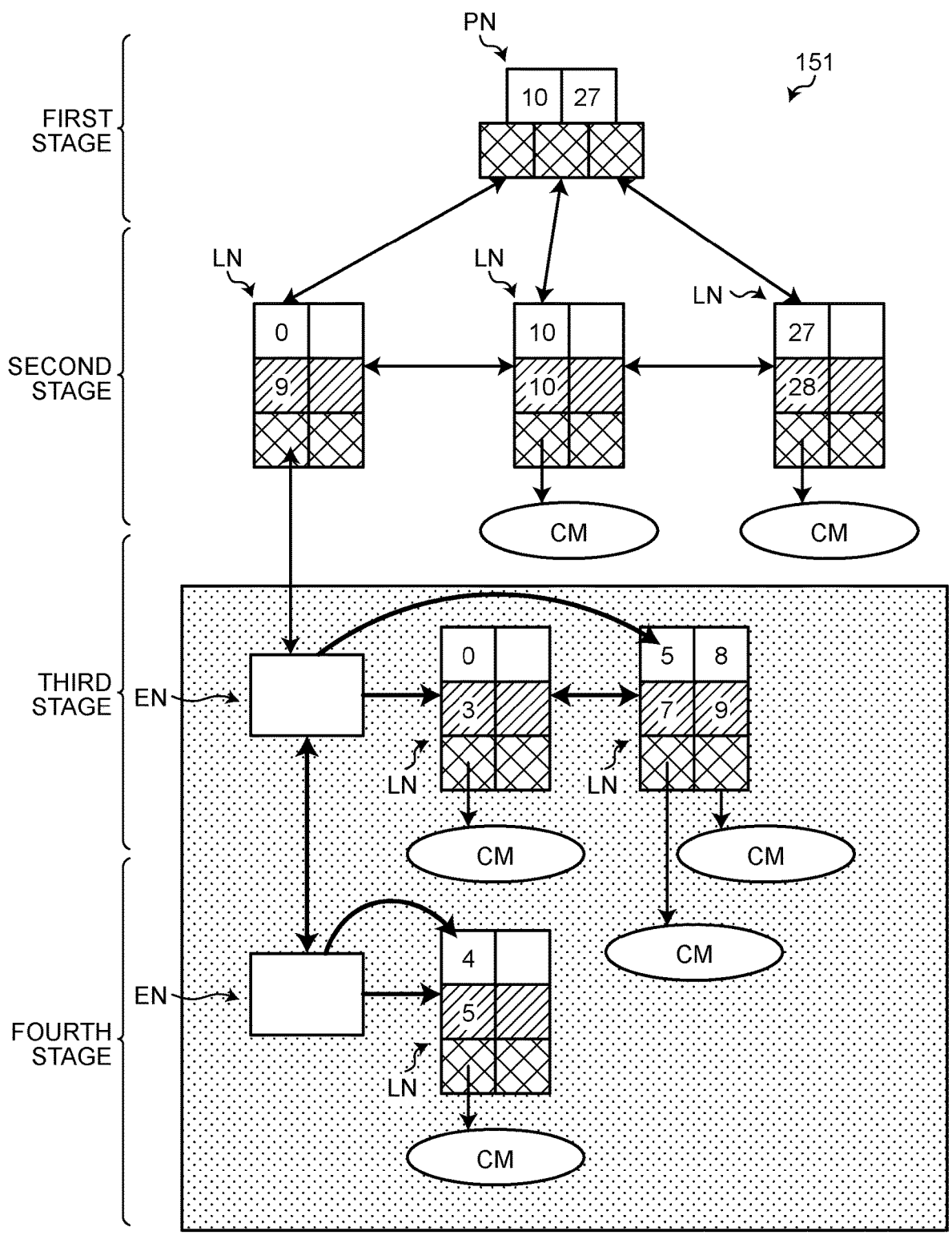
FIG. 3 is a diagram illustrating a data structure of a database according to the embodiment.

Next, a data structure of the database 151 will be described with reference to FIG. 3. FIG. 3 is a diagram illustrating a data structure of the database 151.

The database 151 has a hierarchized tree-like array. The database 151 is based on a B+ tree data structure, and a data structure including a function of handling key ranges and a function of handling time series of nodes is added. The database 151 has at least one leaf node LN. The database 151 may have a plurality of leaf nodes LN. The database 151 may further include one or more parent nodes PN. The plurality of leaf nodes LN may depend on one or more parent nodes PN. Although it is illustrated in FIG. 3 that the number of parent nodes PN at an upper stage than the leaf nodes LN is one, the number of parent nodes PN at an upper stage than the leaf nodes LN may be two or more. The database 151 may have a tree-like array in which a plurality of parent nodes PN are hierarchized at upper stages than the leaf nodes LN. The database 151 can hierarchically add extension nodes EN and leaf nodes LN depending on one of the plurality of leaf nodes LN. The extension node EN connects the leaf nodes LN having a dependence relationship.

In the database 151, the parent node PN may have keys SK of which the maximum number is i (i≥2) and branches BR of which the number is i+1, and the leaf node LN may have keys SK of which the maximum number is i, keys EK of which the maximum number is i, and branches BR of which the number is i.

Figure 4A:
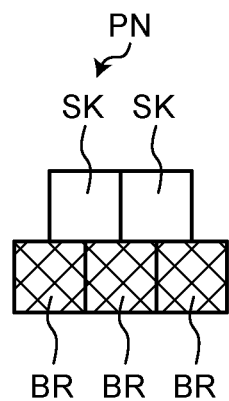
FIGS. 4A and 4B are diagrams illustrating data structures of a parent node and a leaf node according to the embodiment.

FIG. 4A illustrates a parent node PN having keys SK of which the maximum number is two and branches BR of which the number is three. The parent node PN illustrated in FIG. 4A is associated with two keys SK and three branches BR. Each of the two keys SK is a start key, and corresponds to, for example, a head address in the address range of the command. Each of the three branches BR stores a pointer to a leaf node LN depending thereon. The left branch BR in FIG. 4A stores a pointer to a leaf node LN having a key smaller than the key SK. The right branch BR in FIG. 4A stores a pointer to a leaf node LN having a key equal to or greater than the key SK.

Figure 4B:
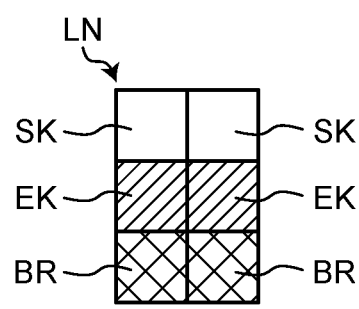

FIG. 4B illustrates a leaf node LN having keys SK of which the maximum number is two, keys EK of which the maximum number is two, and branches BR of which the number is two. The leaf node LN illustrated in FIG. 4B is associated with two keys SK, two keys EK, and two branches BR. Each of the two keys SK is a start key, and corresponds to, for example, a head address in the address range of the command. Each of the two keys EK is an end key, and corresponds to, for example, a tail address in the address range of the command. The key SK and the key EK arranged vertically form a pair. The function of handling key ranges can be realized by the two pairs of keys SK and EK, respectively. The two branches BR store pointers to two commands CM corresponding to the two pairs of keys SK and EK or pointers to extension nodes EN.

The extension node EN illustrated in FIG. 3 stores a pointer to a leaf node LN on which the extension node EN depends. When another extension node EN depends on the extension node EN, the extension node EN further stores a pointer to the another extension node EN.

The database 151 has a hierarchical structure at a plurality of stages. At the third and subsequent stages illustrated in FIG. 3, a lower stage is newer. That is, as indicated by hatching in FIG. 3, when there are extension nodes, the lower the stage, the newer the dependent command CM. As a result, in the database 151, the function of handling time series of nodes can be realized. In FIG. 3, a database 151 having a four-stage data structure is illustrated.

At the first stage, there is a parent node PN with SK=10, 27.

At the second stage, there are a leaf node LN with SK=0 and EK=9, a leaf node LN with SK=10 and EK=10, and a leaf node LN with SK=27 and EK=28. The leaf node LN with SK=0 and EK=9 is associated with an extension node EN at the third stage, and the leaf node LN with SK=10 and EK=10 and the leaf node LN with SK=27 and EK=28 are associated with commands CM.

At the third stage, there are an extension node EN, a leaf node LN with SK=0 and EK=3, and a leaf node LN with SK=5 and EK=7 and SK=8 and EK=9. Each of the leaf node LN with SK=0 and EK=3 and the leaf node LN with SK=5 and EK=7 and SK=8 and EK=9 depends on the leaf node LN with SK=0 and EK=9 via the extension node EN. The command CM is associated with each of the leaf node LN with SK=0 and EK=3 and the leaf node LN with SK=5 and EK=7 and SK=8 and EK=9.

At the fourth stage, there are an extension node EN and a leaf node LN with SK=4 and EK=5. The leaf node LN with SK=4 and EK=5 depends on the leaf node LN with SK=0 and EK=9 via the two extension nodes EN. A command CM is associated with the leaf node LN with SK=4 and EK=5.

In the database 151, since each leaf node LN is associated with a pair of keys SK and EK indicating an address range of a command, it is possible to manage an overlap between address ranges of commands CM. In the database 151, leaf nodes LN corresponding to an overlapping address range are connected to each other at a plurality of stages. In the example of FIG. 3, the leaf node LN with SK=5 and EK=7 at the third stage and the leaf node LN with SK=4 and EK=5 at the fourth stage have an overlapping key range (an overlapping address range between commands CM), and are connected to each other via the two extension nodes EN. The leaf node LN with SK=4 and EK=5 at the fourth stage is temporally newer than the leaf node LN with SK=5 and EK=7 at the third stage. As a result, the overlap between the address ranges of the commands CM can be managed in time series.

Note that, in the present specification, in the database 151, the second stage may be referred to as an upper layer, and the third or subsequent stage may be referred to as a lower layer. In addition, since a key in the database 151 corresponds to an address of a command on a one-to-one basis, the key may be referred to as an address.

The operation unit 10b2 illustrated in FIG. 2 can add a command CM to the database 151, delete the command CM, add or delete an extension node EN and/or a leaf node LN accordingly, and the like.

The operation unit 10b2 can add a command CM to the extension node EN. When there is an overlapping key range (address range) with respect to a leaf node LN having extension nodes EN, the operation unit 10b2 adds a command CM to a leaf node LN owned by a lowest-layer extension node EN among the extension nodes EN managed by the leaf node LN.

The operation unit 10b2 can delete a command CM of an extension node EN. When the command CM managed by the extension node EN is deleted, if there is no command CM managed by a certain extension node EN, the operation unit 10b2 deletes the extension node EN. Interpolation is performed at an extension node EN connected to a lower stage than the extension node EN.

The selection unit 10b3 illustrated in FIG. 2 searches for a command CM managed in the database 151 using a key range (an address range), and sends a search result to the control unit 10a as an output command.

The method of searching for the command CM is not limited to the method in which a specific key range (address range) is designated to search from the parent node PN at the uppermost layer to lower layers.

In a case where the control unit 10a desires to determine a necessary command CM from among a plurality of commands CM received from the selection unit 10b3, the selection unit 10b3 searches for a command by a bidirectional linear search with a leaf node LN having a certain key range (address range) as a reference and sends the command to the control unit 10a.

The operation unit 10b2 can create an extension node EN. For example, it is assumed that an address range of an input command CM overlaps with a key range (address range) of a leaf node LN holding the command CM. At this time, a branch BR of the leaf node LN is created, and the command CM moves to the branch BR. Further, an extension node EN and a leaf node LN are created ahead of the extension node EN and the leaf node LN, and the command CM is managed there.

The operation unit 10b2 can move the command CM to the extension node EN. In a case where an overlap occurs between a plurality of commands CM, the operation unit 10b2 moves all the commands CM to the extension node EN. When a key range (address range) of a new command CM overlaps with a key range (address range) of a leaf node LN having an extension node EN, the key range (address range) of the new command CM also overlaps with a key range (address range) of a leaf node LN having the extension node EN connected to the leaf node LN.

The operation unit 10b2 can integrate extension nodes EN.

Figure 5:
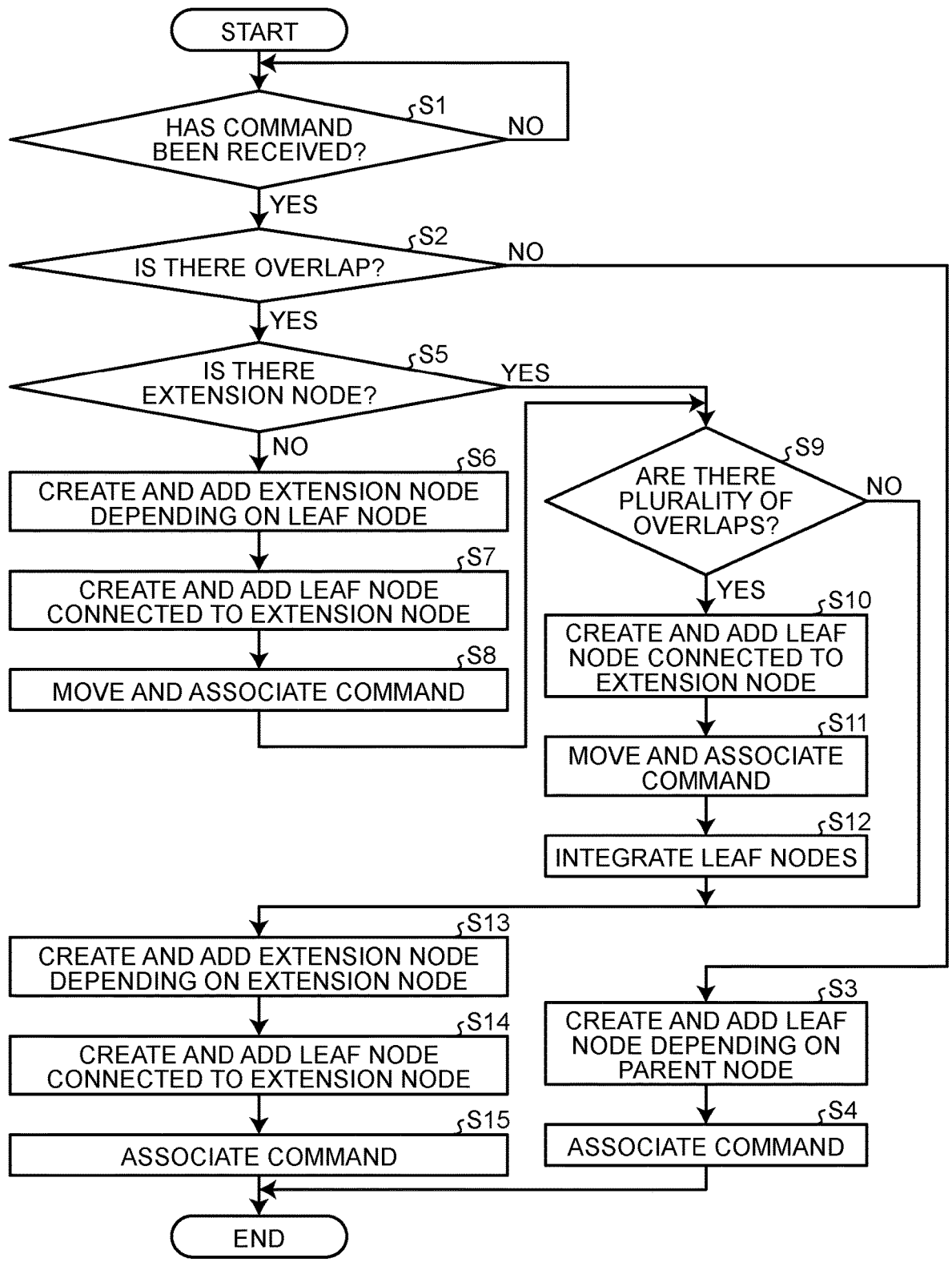
FIG. 5 is a flowchart illustrating an operation when a command is received according to the embodiment.

Next, an operation when a command is received will be described with reference to FIG. 5. FIG. 5 is a flowchart illustrating an operation when a command is received.

In the disk device 10, the control unit 10a stands by until a command CM is received (No in S1).

When a command CM is received (Yes in S1), the control unit 10a supplies the received command CM and a request for adding the received command CM to the operation unit 10b2. The operation unit 10b2 specifies an address range from an address and a data size included in the command CM or by designating the address range. According to the request, the operation unit 10b2 accesses the database 151, and determines whether the specified address range overlaps with an address range of the command CM in the database 151 (S2).

When the specified address range does not overlap with the address range of the command CM in the database 151 (No in S2), the operation unit 10b2 creates and/or adds a leaf node LN depending on the parent node PN (S3), and associates the command CM with the leaf node LN (S4).

When the specified address range overlaps with the address range of the command CM in the database 151 (Yes in S2), the operation unit 10b2 determines whether there is an extension node EN depending on a leaf node LN corresponding to the overlapping address range (S5).

Figure 6B:
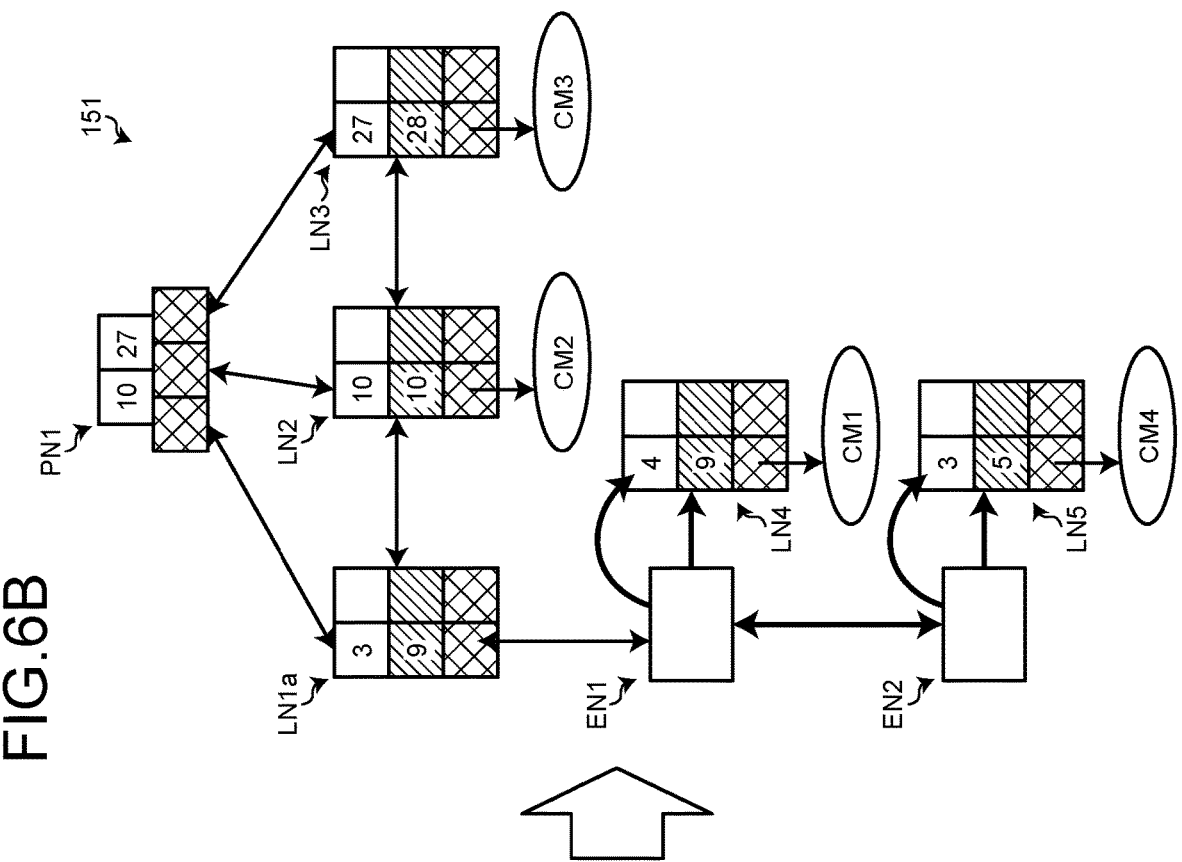
FIGS. 6A and 6B are diagrams illustrating an operation of the database when a command is received according to the embodiment.
Figure 6A:
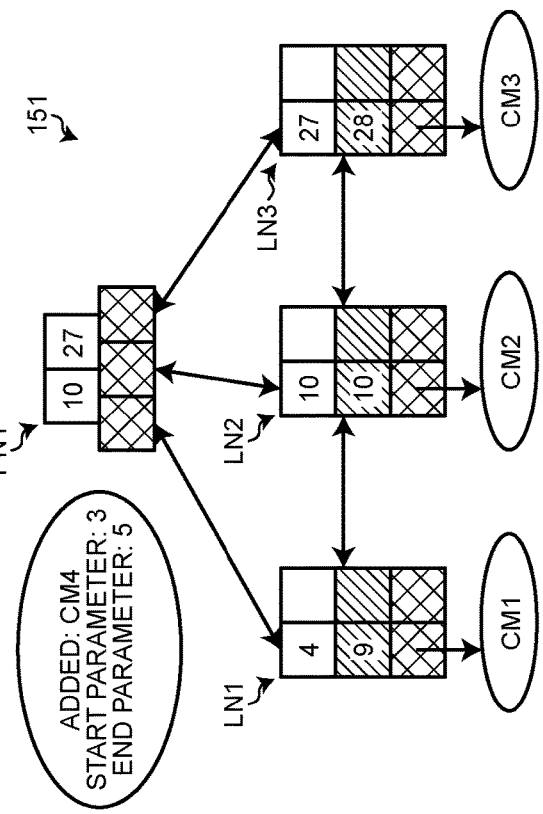

For example, in a database 151 illustrated in FIG. 6A, three leaf nodes LN1 to LN3 depend on a parent node PN1. FIGS. 6A and 6B are diagrams illustrating an operation of the database 151 when a command is received. The three leaf nodes LN1 to LN3 are associated with three commands CM1 to CM3. A received command CM4 has an address range of 3 to 5, which overlaps with an address range of 4 to 9 of the command CM1 of the leaf node LN1. In this case, no extension node EN depends on the leaf node LN1. The operation unit 10b2 determines that there is no extension node EN depending on the leaf node LN1 corresponding to the overlapping address range.

Figure 7B:
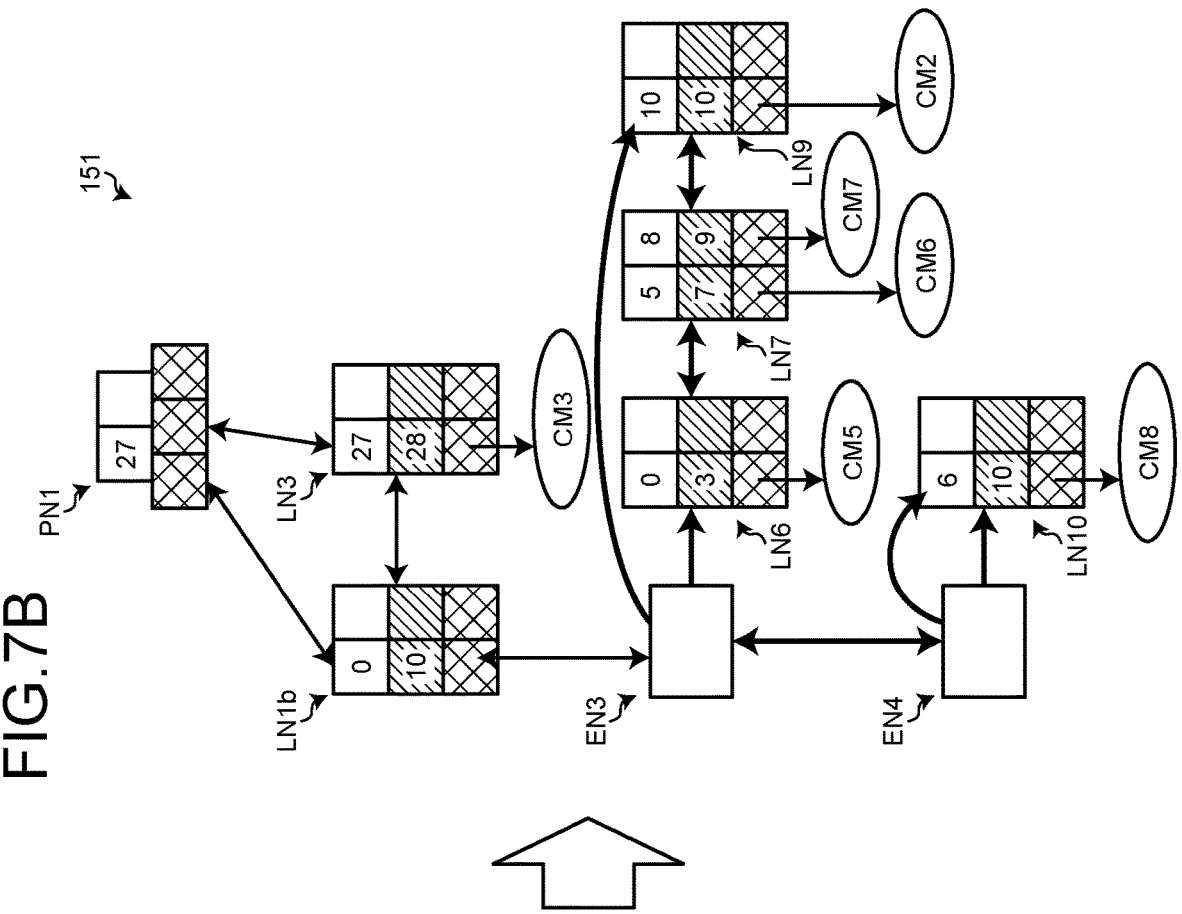
FIGS. 7A and 7B are diagrams illustrating an operation of the database when a command is received according to the embodiment.
Figure 7A:
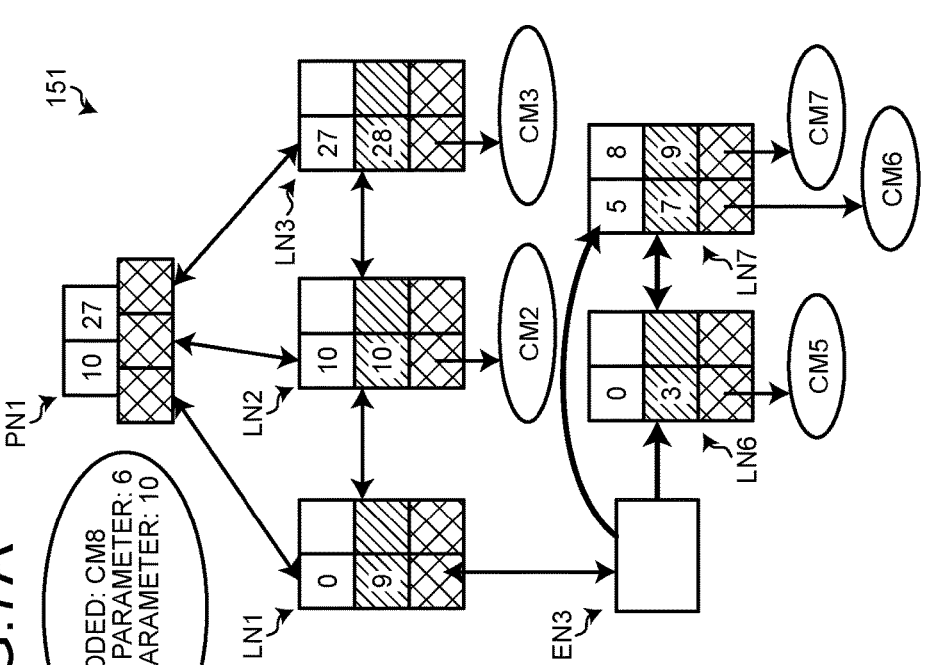

Alternatively, in a database 151 illustrated in FIG. 7A, three leaf nodes LN1 to LN3 depend on a parent node PN1, and three leaf nodes LN6 to LN7 depend on one leaf node LN1 via an extension node EN3. FIGS. 7A and 7B are diagrams illustrating an operation of the database 151 when a command is received. One leaf node LN1 is associated with commands CM5 to CM7 via the extension node EN3. The two leaf nodes LN2 and LN3 are associated with two commands CM2 and CM3. The two leaf nodes LN6 and LN7 are associated with three commands CM5 to CM7. A received command CM8 has an address range of 6 to 10, which overlaps with an address range of 0 to 9 of the command CM1 of the leaf node LN1, and overlaps with an address range of 10 of the command CM2 of the leaf node LN2. In this case, the extension node EN3 depends on the leaf node LN1. The operation unit 10b2 determines that there is an extension node EN depending on the leaf node LN1 corresponding to the overlapping address range.

If there is no extension node EN (No in S5), the operation unit 10b2 creates and adds an extension node EN (S6), creates and adds a leaf node LN connected to the extension node EN (S7), and moves the command CM and associates the command CM with the leaf node LN (S8).

For example, in the database 151 illustrated in FIG. 6A, an extension node EN1 is created and added under the leaf node LN1. As illustrated in FIG. 6B, a leaf node LN4 connected to the extension node EN1 is created and added, and the command CM1 is moved from the leaf node LN1 and associated with the leaf node LN4.

After S8 or when there is an extension node EN (Yes in S5), the operation unit 10b2 determines whether address ranges of commands CM corresponding to a plurality of leaf nodes LN overlap with the address range of the command CM of S1 (S9).

For example, in the database 151 illustrated in FIG. 7A, the address range of 6 to 10 of the command CM8 overlaps with the address range of 0 to 9 of the commands CM5 to CM7 of the leaf node LN1 and the address range of 10 of the command CM2 of the leaf node LN2. The operation unit 10b2 determines that address ranges of commands CM corresponding to a plurality of leaf nodes LN overlap with the address range of the command CM of S1.

When address ranges of commands CM corresponding to a plurality of leaf nodes LN overlap with the address range of the command CM of S1 (Yes in S9), the operation unit 10b2 creates and adds a leaf node LN connected to the extension node EN (S10). The operation unit 10b2 moves the command CM and associates the command CM with the leaf node LN (S11), and integrates the plurality of leaf nodes LN corresponding to the overlapping address range (S12).

In the database 151 illustrated in FIG. 7A, a leaf node LN9 connected to the extension node EN3 is created and added. The operation unit 10b2 moves the command CM2 and associates the command CM2 with the leaf node LN9, and integrates the plurality of leaf nodes LN1 and LN2 corresponding to the overlapping address range into a leaf node LN1b. Accordingly, the address range of the leaf node LN1b is changed to 0 to 10.

The operation unit 10b2 creates and adds an extension node EN depending on the extension node EN (S13), creates and adds a leaf node LN connected to the extension node EN (S14), and associates the command CM received in S1 with the leaf node LN (S15).

For example, in the database 151 illustrated in FIG. 6B, the operation unit 10b2 creates and adds an extension node EN2 depending on the extension node EN1. The operation unit 10b2 creates and adds a leaf node LN5 connected to the extension node EN2, and associates the received command CM4 with the leaf node LN5. Accordingly, the address range of the upper leaf node LN1a is changed to 3 to 9.

Alternatively, in the database 151 illustrated in FIG. 7B, the operation unit 10b2 creates and adds an extension node EN4 depending on the extension node EN3. The operation unit 10b2 creates and adds a leaf node LN10 connected to the extension node EN4, and associates the received command CM8 with the leaf node LN10.

Next, an operation when commands are merged will be described with reference to FIG. 8. FIG. 8 is a flowchart illustrating an operation when commands are merged.

The control unit 10a stands by until a timing to merge commands (No in S21). The control unit 10a may determine that it is a timing to merge commands CM as a predetermined cycle elapses. The control unit 10a may determine that it is a timing to merge commands CM in an idle period in which a processing load of the disk device 10 is kept equal to or smaller than a threshold value for a predetermined time or more.

When it is a timing to merge commands CM (Yes in S21), the control unit 10a supplies a request for merging commands CM to the operation unit 10b2. The operation unit 10b2 accesses the database 151 and linearly searches upper-layer leaf nodes LN (S22). The operation unit 10b2 may perform a bidirectional linear search with a leaf node LN at the center of the upper layer as a reference.

For example, in a database 151 illustrated in FIG. 9A, among leaf nodes LN1 to LN3 of the upper layer, the leaf node LN2 is located at the center in the order of addresses. The operation unit 10b2 may linearly search leaf nodes LN on which a plurality of extension nodes EN depend in both ascending order and descending order of addresses, with the leaf node LN2 as a reference. It should be noted that although the center leaf node of the upper layer is exemplified as the reference, another leaf node of the upper layer may be used as the reference.

As a result of the linear search, when there is no extension node EN depending on any leaf node LN (No in S23), the operation unit 10b2 determines that there are no commands CM having an overlapping address range in the database 151, and ends the process.

If there are a plurality of extension nodes EN depending on a leaf node LN (Yes in S23), the operation unit 10b2 sequentially linearly searches leaf nodes LN connected to the plurality of extension nodes EN (S24). For each of the leaf nodes LN connected to the plurality of extension nodes EN, the operation unit 10b2 specifies a type and an address range of a command CM associated with the leaf node LN.

For example, in the database 151 illustrated in FIG. 9A, a plurality of extension nodes EN3, EN5, and EN6 depend on the leaf node LN1. The operation unit 10b2 linearly searches leaf nodes LN6 and LN7 connected to the extension node EN3, and specifies that types of commands CM5, CM6, and CM7 associated with the leaf nodes LN6 and LN7 are all write commands, and address ranges of the commands CM5, CM6, and CM7 are 0 to 3, 5 to 7, and 8 to 9, respectively. The operation unit 10b2 linearly searches a leaf node LN11 connected to the extension node EN5, and specifies that a type of a command CM9 associated with the leaf node LN11 is a write command, and an address range of the command CM9 is 4 to 5. The operation unit 10b2 linearly searches a leaf node LN12 connected to the extension node EN6, and specifies that a type of a command CM10 associated with the leaf node LN12 is a write command, and an address range of the command CM10 is 4 to 5.

As a result of S24, when there is no overlapping address range between commands CM in the same type (No in S25), the operation unit 10b2 ends the process.

When there is an overlapping address range between commands CM in the same type (Yes in S25), the operation unit 10b2 merges the plurality of commands CM having an overlapping address range in the same type (S26).

For example, in the database 151 illustrated in FIG. 9A, the operation unit 10b2 merges a plurality of commands CM5, CM6, CM7, CM9, and CM10 having an overlapping address range in the same type into a command CM11. Accordingly, the operation unit 10b2 integrates the extension nodes EN3, EN5, and EN6 into an extension node EN3a, and integrates the leaf nodes LN6, LN7, LN11, and LN12 into a leaf node LN6a connected to the extension node EN3a. The operation unit 10b2 associates the command CM11 with the leaf node LN6a, and changes the address range of the leaf node LN6a to 0 to 9.

Figure 10:
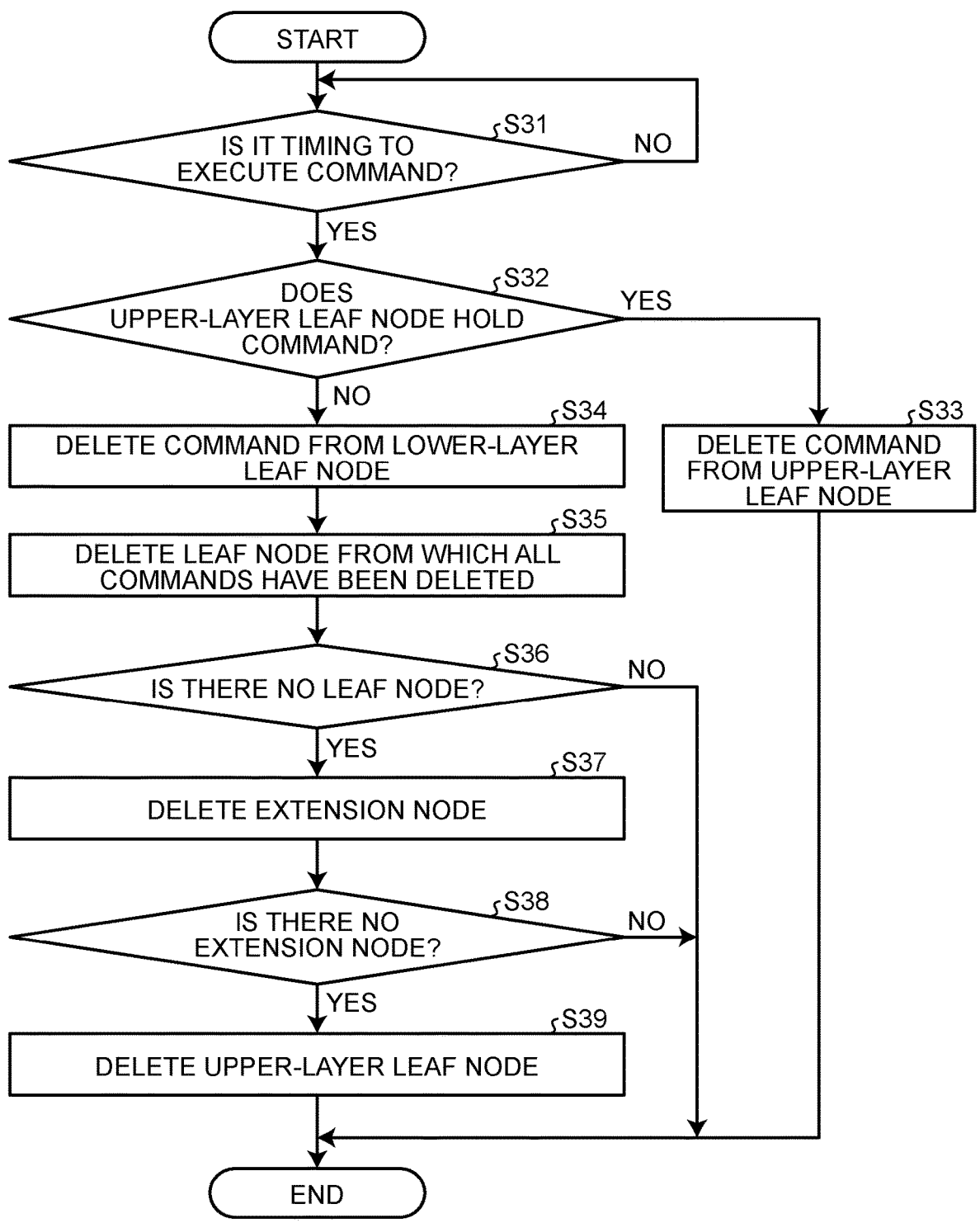
FIG. 10 is a flowchart illustrating an operation when a command is executed according to the embodiment.

Next, an operation when a command is executed will be described with reference to FIG. 10. FIG. 10 is a flowchart illustrating an operation when a command is executed.

In the disk device 10, the control unit 10a stands by until a timing to execute a command CM (No in S31).

When it is a timing to execute a command CM (Yes in S31), the control unit 10a supplies a request for selecting a command CM to be executed from the database 151 to the selection unit 10b3. According to the request, the selection unit 10b3 accesses the database 151, and linearly searches an upper-layer leaf node LN to see if it holds the requested command CM. The selection unit 10b3 may perform a bidirectional linear search with a leaf node LN at the center of the upper layer as a reference. It should be noted that although the center leaf node of the upper layer is exemplified as the reference, another leaf node of the upper layer may be used as the reference.

Figure 11B:
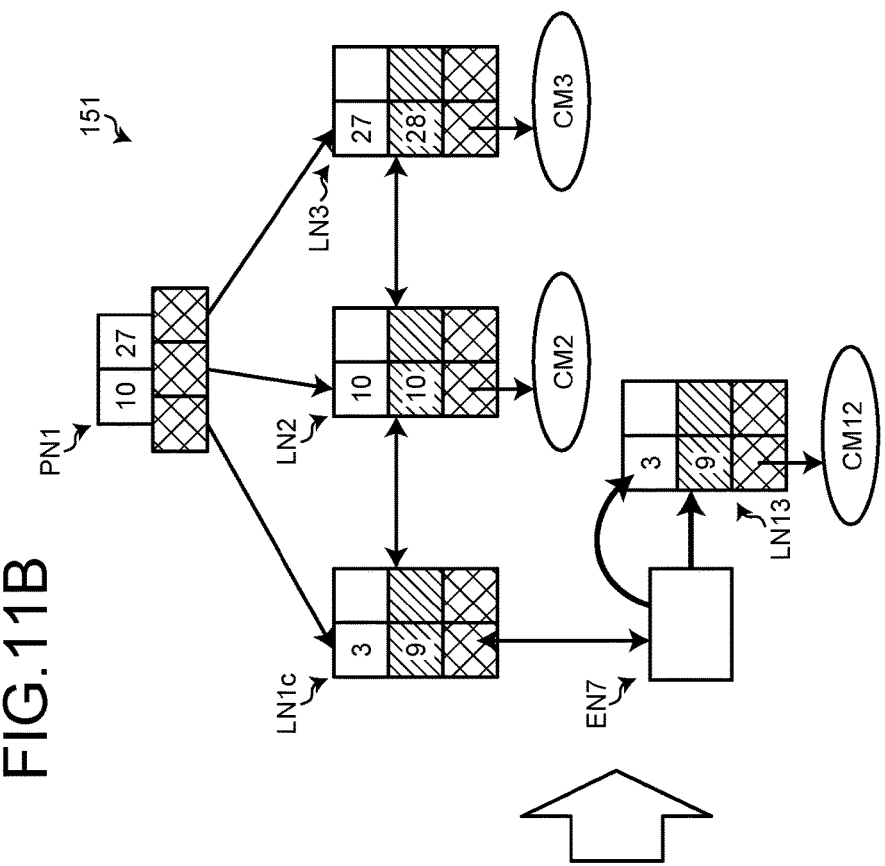
FIGS. 11A and 11B are diagrams illustrating an operation of the database when a command is executed according to the embodiment.
Figure 11A:
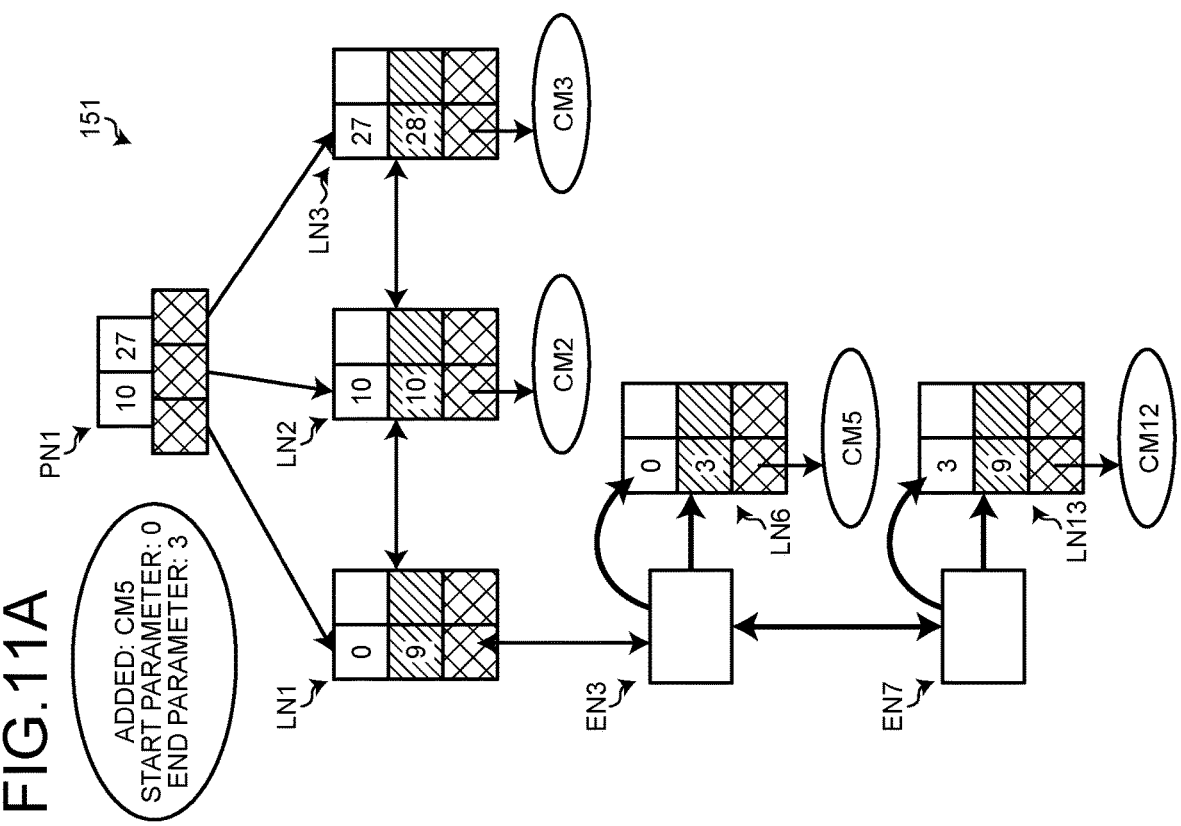

For example, in a database 151 illustrated in FIG. 11A, the selection unit 10b3 may perform a linear search in both ascending order and descending order of addresses with the central leaf node LN2 among upper-layer leaf nodes LN1 to LN3 as a reference. As a result of the linear search, the selection unit 10b3 determines that none of the upper-layer leaf nodes LN1 to LN3 holds the requested command CM5. An address range of the command CM5 is 0 to 3.

Alternatively, in a database 151 illustrated in FIG. 12A, the selection unit 10b3 may perform a linear search in both ascending order and descending order of addresses with the central leaf node LN2 among upper-layer leaf nodes LN1c to LN3 as a reference. As a result of the linear search, the selection unit 10b3 determines that none of the upper-layer leaf nodes LN1c to LN3 holds the requested command CM12. An address range of the command CM12 is 3 to 9.

When an upper-layer leaf node LN holds the requested command CM (Yes in S32), the selection unit 10b3 selects the command CM from the upper-layer leaf node LN and supplies the command CM to the control unit 10a as an output command. The control unit 10a executes the supplied command CM. At the same time, the control unit 10a issues a request for deletion according to information on the selected command CM and supplies the request to the operation unit 10b2. The operation unit 10b2 deletes the selected command CM from the upper-layer leaf node LN (S33).

When the upper-layer leaf node LN does not hold the requested command CM (No in S32), the selection unit 10b3 linearly search a lower-layer leaf node LN. The selection unit 10b3 selects the command CM from the lower-layer leaf node LN and supplies the command CM to the control unit 10a as an output command. The control unit 10a executes the supplied command CM.

At the same time, the control unit 10a issues a request for deletion according to information on the selected command CM and supplies the request to the operation unit 10b2. The operation unit 10b2 deletes the selected command CM from the lower-layer leaf node LN (S33).

For example, in the database 151 illustrated in FIG. 11A, the selection unit 10b3 linearly searches a third-stage leaf node LN6. As a result of the linear search, the selection unit 10b3 determines that the third-stage leaf node LN6 holds the requested command CM5. The selection unit 10b3 selects the command CM5 from the third-stage leaf node LN6 and supplies the command CM5 to the control unit 10a as an output command. The control unit 10a executes the supplied command CM5. At the same time, the control unit 10a issues a request for deletion according to information on the selected command CM5 and supplies the request to the operation unit 10b2. The operation unit 10b2 deletes the command CM5 from the lower-layer leaf node LN6.

Alternatively, in the database 151 illustrated in FIG. 12A, the selection unit 10b3 linearly searches a third-stage leaf node LN13. As a result of the linear search, the selection unit 10b3 determines that the third-stage leaf node LN13 holds the requested command CM12. The selection unit 10b3 selects the command CM12 from the third-stage leaf node LN13 and supplies the command CM12 to the control unit 10a as an output command. The control unit 10a executes the supplied command CM12. At the same time, the control unit 10a issues a request for deletion according to information on the selected command CM5 and supplies the request to the operation unit 10b2. The operation unit 10b2 deletes the command CM12 from the lower-layer leaf node LN13.

The operation unit 10b2 deletes the leaf node LN from which all the commands CM have been deleted (S35), and determines whether there is no leaf node LN connected to the extension node EN as a result of the deletion (S36).

If there is a leaf node LN connected to the extension node EN (No in S36), the operation unit 10b2 ends the process.

If there is no leaf node LN connected to the extension node EN (Yes in S36), the operation unit 10b2 deletes the extension node EN (S37), and determines whether there is no extension node EN depending on the upper-layer leaf node LN as a result of the deletion (S38).

If there is an extension node EN depending on the upper-layer leaf node LN (No in S38), the operation unit 10b2 ends the process.

For example, in the database 151 illustrated in FIG. 11A, the operation unit 10b2 deletes the leaf node LN6 from which the command CM5 has been deleted. As a result of the deletion, the operation unit 10b2 determines that there is no leaf node LN connected to the extension node EN3, and deletes the extension node EN3. As a result, the database 151 is in a state illustrated in FIG. 11B. As a result of the deletion, the operation unit 10b2 determines that there is an extension node EN7 depending on the upper-layer leaf node LN1c. The operation unit 10b2 changes the address range of the upper-layer leaf node LN1c to 3 to 9, and ends the process.

When there is no extension node EN depending on the upper-layer leaf node LN (Yes in S38), the operation unit 10b2 deletes the upper-layer leaf node (S39).

For example, in the database 151 illustrated in FIG. 12A, the operation unit 10b2 deletes the leaf node LN13 from which the command CM12 has been deleted. As a result of the deletion, the operation unit 10b2 determines that there is no leaf node LN connected to the extension node EN7, and deletes the extension node EN7. As a result of the deletion, the operation unit 10b2 determines that there is no extension node EN depending on the upper-layer leaf node LN1c, and deletes the upper-layer leaf node LN1c. As a result, the database 151 is in a state illustrated in FIG. 12B.

As described above, in the disk device 10 according to the present embodiment, the controller 19 manages commands using the database 151. The database 151 is associated with address ranges of the commands CM, and is arrayed in a tree shape according to addresses and time series of the commands CM. For example, as a data structure of the database 151, a structure corresponding to a function of managing the address ranges of the commands and a function of managing the time series of the commands is added to the B+ tree data structure. As a result, the overlap between the address ranges of the commands CM can be managed in time series. Consequently, in the database 151, it is possible to efficiently perform a linear search for examining the commands CM having an overlapping or close address range, and for example, it is possible to efficiently merge the commands CM.

In addition, in the disk device 10 according to the present embodiment, in the database 151, since each leaf node LN is associated with a pair of keys SK and EK indicating an address range of a command, it is possible to manage an overlap between address ranges of commands CM. In the database 151, leaf nodes LN corresponding to an overlapping address range are connected to each other at a plurality of stages. At the plurality of stages, in the third and subsequent layers from the top, a lower stage is temporally newer than an upper stage. As a result, as a data structure of the database 151, a structure corresponding to a function of managing the address ranges of the commands and a function of managing the time series of the commands can be added to the B+ tree data structure. Consequently, it is possible to improve the database 151 so that an overlap between the address ranges of the commands CM can be managed in time series while retaining the advantages of the B+ tree data structure.

For example, when selecting a command selection in the disk device 10, if one is interested in the oldest command among commands having an overlapping address range, the commands are managed in an easy-to-select state in the database 151.

In addition, in the database 151, the functions are expanded by adding an extension node EN as an overlap between address ranges occurs. Therefore, in the database 151, the functions are not extended in a state where there is no overlap between address ranges, and the data structure is not affected by time information. As a result, redundancy between the size of the data structure and the update process thereof is suppressed in the database 151.

Note that the database 151 may have a configuration in which the extension node EN is omitted. In this case, a head leaf node LN of each stage can have a function corresponding to the extension node EN. A pointer to a head leaf node LN of a lower layer is stored in a branch BR of a leaf node LN of an upper layer. In a case where another leaf node LN is connected to the head leaf node LN of each stage, a pointer to the leaf node LN to which the another leaf node LN is connected is stored in a branch BR thereof. In a case where a head leaf node LN of a lower stage further depends on the head leaf node LN of each stage, a pointer to the leaf node LN on which the head leaf node LN of the lower stage depends is stored.

Figure 13:
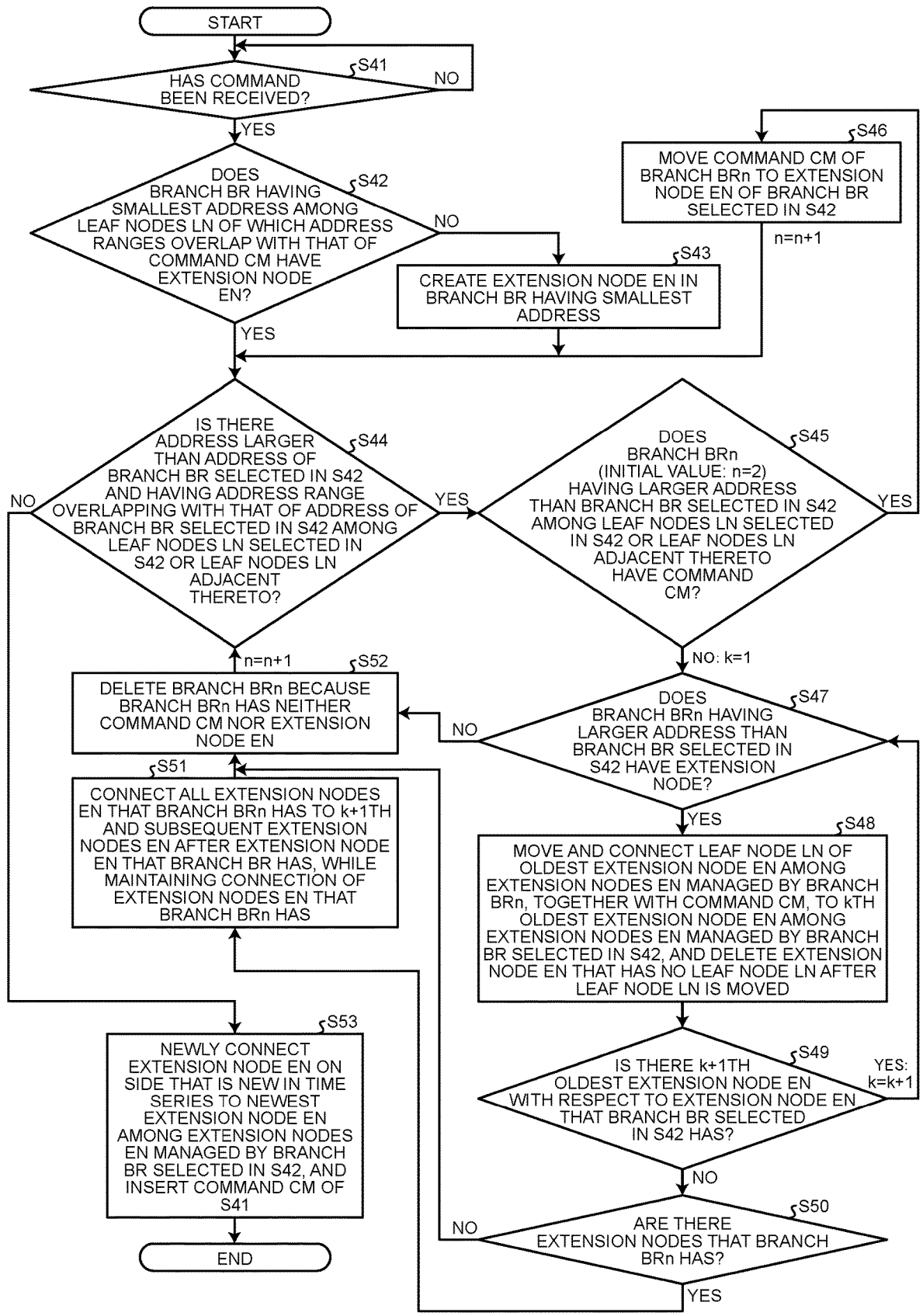
FIG. 13 is a flowchart illustrating an operation when a command is received according to a first modification of the embodiment.

As a first modification of the embodiment, the controller 19 may integrate extension nodes EN in a database 151 when a command is received, as illustrated in FIG. 13. FIG. 13 is a flowchart illustrating an operation when a command is received.

In the disk device 10, the control unit 10a stands by until a command is received (No in S41).

When a command CM is received (Yes in S41), the control unit 10a supplies the received command CM and a request for adding the received command CM to the operation unit 10b2. The operation unit 10b2 specifies an address range from an address and a data size included in the command. According to the request, the operation unit 10b2 accesses the database 151, and determines whether a branch BR having the smallest address among leaf nodes LN of which address ranges overlap with that of the command CM has an extension node EN (S42).

When the branch BR having the smallest address does not have an extension node EN (No in S42), the operation unit 10b2 creates an extension node EN in the branch BR having the smallest address (S43), and advances the process to S44.

When the branch BR having the smallest address has an extension node EN (Yes in S42), the operation unit 10b2 determines whether there is an address larger than the address of the branch BR selected in S42 and having an address range overlapping with that of the address of the branch BR selected in S42 among the leaf nodes LN selected in S42 or leaf nodes LN adjacent thereto (S44).

When there is an address larger than the address of the branch BR selected in S42 and having an address range overlapping with that of the address of the branch BR selected in S42 among the leaf nodes LN selected in S42 or leaf nodes LN adjacent thereto (Yes in S44), the operation unit 10b2 determines whether a branch BRn (initial value: n=2) having a larger address than the branch BR selected in S42 among the leaf nodes LN selected in S42 or the leaf nodes LN adjacent thereto has the command CM (S45).

When a branch BRn having a larger address than the branch BR selected in S42 among the leaf nodes LN selected in S42 or the leaf nodes LN adjacent thereto has the command CM (Yes in S45), the operation unit 10b2 moves the command CM of the branch BRn to the extension node EN of the branch BR selected in S42 (S46). The operation unit 10b2 increments n and returns the process to S44.

When a branch BRn having a larger address than the branch BR selected in S42 among the leaf nodes LN selected in S42 or the leaf nodes LN adjacent thereto does not have the command CM (No in S45), the operation unit 10b2 sets 1, which is an initial value, to k, and determines whether the branch BRn having a larger address than the branch BR selected in S42 has an extension node EN (S47).

When the branch BRn having a larger address than the branch BR selected in S42 has an extension node EN (Yes in S47), the operation unit 10b2 moves and connects a leaf node LN of an oldest extension node EN among extension nodes EN managed by the branch BRn, together with the command CM, to a kth oldest extension node EN among extension nodes EN managed by the branch BR selected in S42, and deletes the extension node EN that has no leaf node LN after the leaf node LN is moved (S48).

Thereafter, the operation unit 10b2 determines whether there is a k+1th oldest extension node EN with respect to the extension node EN that the branch BR selected in S42 has (S49).

When there is a k+1th oldest extension node EN (Yes in S49), the operation unit 10b2 increments k and returns the process to S47.

When there is no k+1th oldest extension node EN (No in S49), the operation unit 10b2 determines whether there are extension nodes EN that the branch BRn has (S50).

When there are extension nodes EN that the branch BRn has (Yes in S50), while maintaining the connection of the extension nodes EN that the branch BRn has, the operation unit 10b2 connects all the extension nodes EN that the branch BR has to k+1th and subsequent extension nodes EN after the extension node EN that the branch BR has (S51), and advances the process to S52.

When there is no extension node EN that the branch BRn has (No in S50), the operation unit 10b2 deletes the branch BRn because the branch BRn has neither the command CM nor the extension node EN (S52), and returns the process to S44.

When there is no address larger than the address of the branch BR selected in S42 and having an address range overlapping with that of the address of the branch BR selected in S42 among the leaf nodes LN selected in S42 or leaf nodes LN adjacent thereto (No in S44), the operation unit 10b2 newly connects an extension node EN on a side that is new in time series to the newest extension node EN among extension nodes EN managed by the branch BR selected in S42, and inserts the command CM of S41 (S53).

As described above, in the disk device 10, when a command is received, the controller 19 can add the received command CM to the database 151 while integrating and organizing extension nodes EN in the database 151.

As a second modification of the embodiment, the database 151 may be operated as illustrated in FIGS. 14A to 16 according to the operation of the disk device 10 illustrated in FIG. 13. FIGS. 14A, 14B, 15A, 15B, and 16 are diagrams each illustrating an operation of a database when a command is received.

Figure 14A:
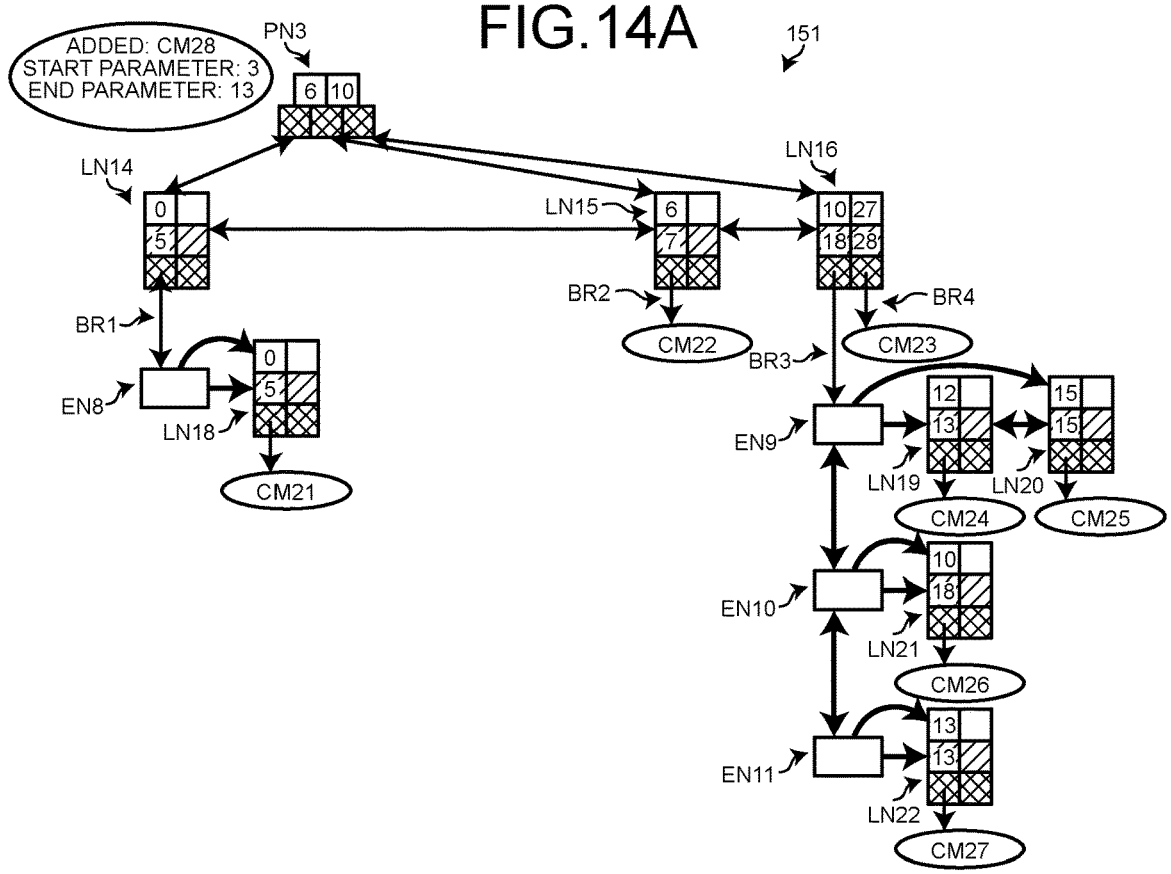
FIGS. 14A and 14B are diagrams illustrating an operation of the database when a command is received according to a second modification of the embodiment.

In the database 151 illustrated in FIG. 14A, three leaf nodes LN14, LN15, and LN16 depend on a parent node PN3, and accordingly, there are four branches BR1, BR2, BR3, and BR4.

When a command CM28 is received (Yes in S41), it is requested to add the command CM28. The command CM28 has an address range of 3 to 13, and the branch BR1 is a branch BR having the smallest address among the leaf nodes LN14, LN15, and LN16 having address ranges overlapping with that of the command CM28. An extension node EN8 depends on the branch BR1. The operation unit 10b2 determines that the branch BR1 having the smallest address has an extension node EN8 (Yes in S42).

The address range of the branch BR1 is 0 to 5. The leaf node LN15 has an address range of 6 to 7, which overlaps with that of the command CM28 with the address being larger than that in an address range of 0 to 5. The operation unit 10b2 determines that there is an address larger than the address of the branch BR selected in S42 and having an address range overlapping with that of the address of the branch BR selected in S42 among the leaf nodes LN selected in S42 or leaf nodes LN adjacent thereto (Yes in S44).

A command CM22 is associated with the branch BR2 of the leaf node LN15. The operation unit 10b2 determines that a branch BRn (=BR2) having a larger address than the branch BR selected in S42 among the leaf nodes LN selected in S42 or the leaf nodes LN adjacent thereto has the command CM (Yes in S45).

Figure 14B:
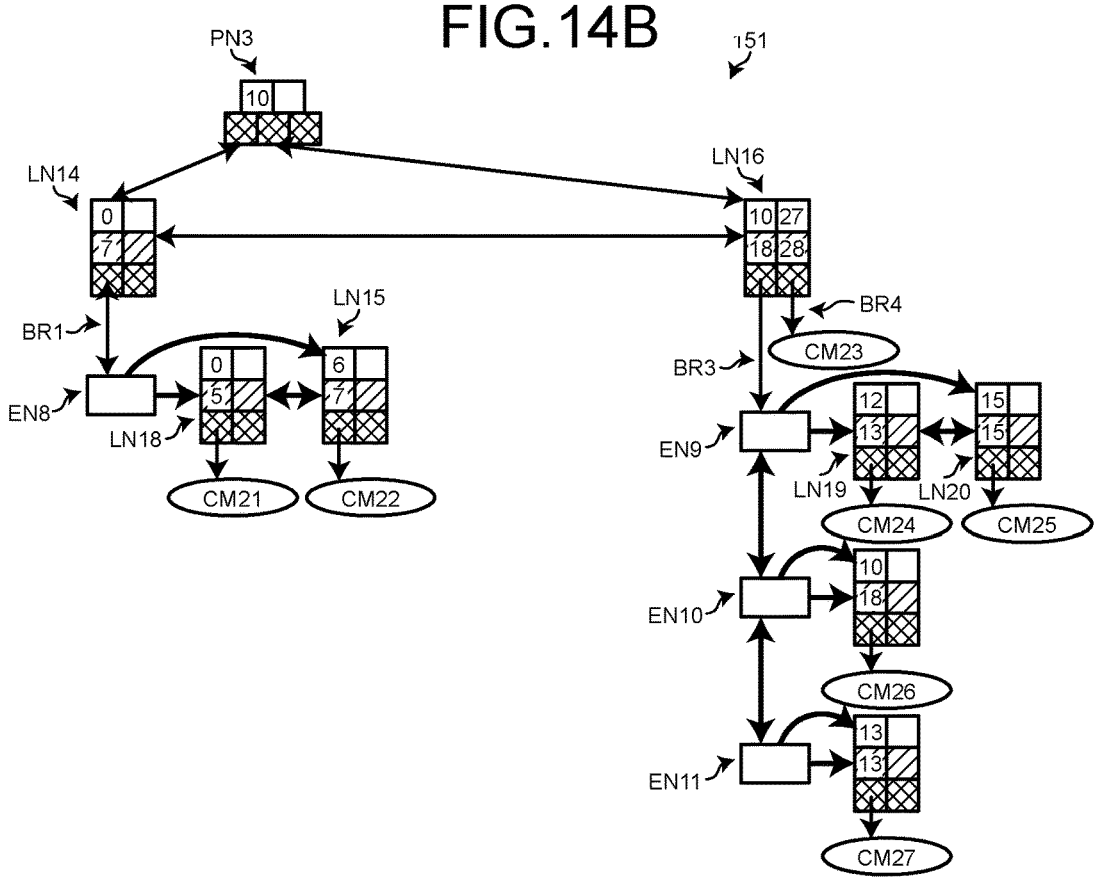

Accordingly, as illustrated in FIG. 14B, the operation unit 10b2 moves the command CM22 of the branch BR2 to the extension node EN8 of the branch BR1 together with the leaf node LN15 (S46). The operation unit 10b2 additionally connects the leaf node LN15 to the extension node EN8. The command CM22 is associated with the leaf node LN15. Accordingly, the operation unit 10b2 changes the address range of the leaf node LN14 to 0 to 7.

The operation unit 10b2 increments n to set n=3.

The address range of the branch BR1 is 0 to 5. The leaf node LN19 has an address range of 12 to 13, which overlaps with that of the command CM28 with the address being larger than that in an address range of 0 to 5. The operation unit 10b2 determines that there is an address larger than the address of the branch BR selected in S42 and having an address range overlapping with that of the address of the branch BR selected in S42 among the leaf nodes LN selected in S42 or leaf nodes LN adjacent thereto (Yes in S44).

In the database 151 illustrated in FIG. 14B, no command CM depends on the branch BR3. The operation unit 10b2 determines that the branch BRn (=BR3) having a larger address than the branch BR selected in S42 among the leaf nodes LN selected in S42 or the leaf nodes LN adjacent thereto does not have the command CM (No in S45). The operation unit 10b2 sets 1 to k as an initial value.

In the database 151 illustrated in FIG. 14B, extension nodes EN9, EN10, and EN11 depend on the branch BR3. The operation unit 10b2 determines that the branch BRn (=BR3) having a larger address than the branch BR selected in S42 has the extension nodes EN9, EN10, and EN11 (Yes in S47).

The operation unit 10b2 moves and connects the leaf nodes LN19 and LN20 that the oldest extension node EN9 among the extension nodes EN9, EN10, and EN11 managed by the branch BRn (=BR3) has, together with the commands CM24 and CM25, to the kth (=first) oldest extension node EN8 among the extension node EN8 managed by the branch BR1 selected in S42, and deletes the extension node EN9 that does not have the leaf nodes LN19 and LN20 after they are moved (S48). Accordingly, the operation unit 10b2 changes the address range of the leaf node LN14 to 0 to 15. The database 151 is in a state illustrated in FIG. 15A.

Figure 15A:
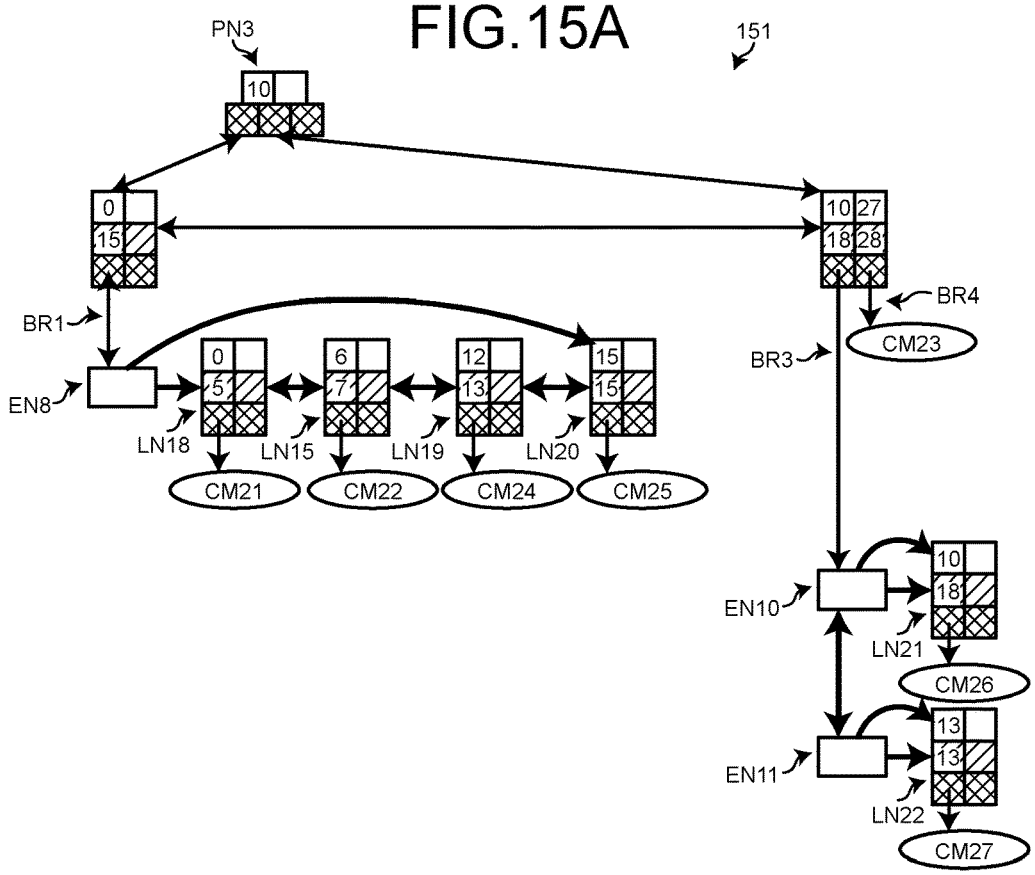
FIGS. 15A and 15B are diagrams illustrating an operation of the database when a command is received according to the second modification of the embodiment.

In the database 151 illustrated in FIG. 15A, the branch BR1 has no next oldest extension node EN after the extension node EN8. The operation unit 10b2 determines that there is no k+1th (=second) oldest extension node EN with respect to the extension node EN that the branch BR1 selected in S42 has (No in S49).

In the database 151 illustrated in FIG. 15A, the extension nodes EN10 and EN11 depend on the branch BR3. The operation unit 10b2 determines that the branch BRn (=BR3) has extension nodes EN10 and EN11 (Yes in S50).

While maintaining the connection of the extension nodes EN10 and EN11 that the branch BRn (=BR3) has, the operation unit 10b2 connects all of the extension nodes EN10 and EN11 to k+1th (=second) and subsequent extension nodes EN after the extension node EN8 that the branch BR1 has (S51). Accordingly, the operation unit 10b2 changes the address range of the leaf node LN14 to 0 to 18.

Since the branch BRn (=BR3) has neither the command CM nor the extension node EN, the operation unit 10b2 deletes the branch BRn (=BR3) (S52). As a result, the database 151 is in a state illustrated in FIG. 15B.

The operation unit 10b2 increments n to set n=4.

Figure 15B:
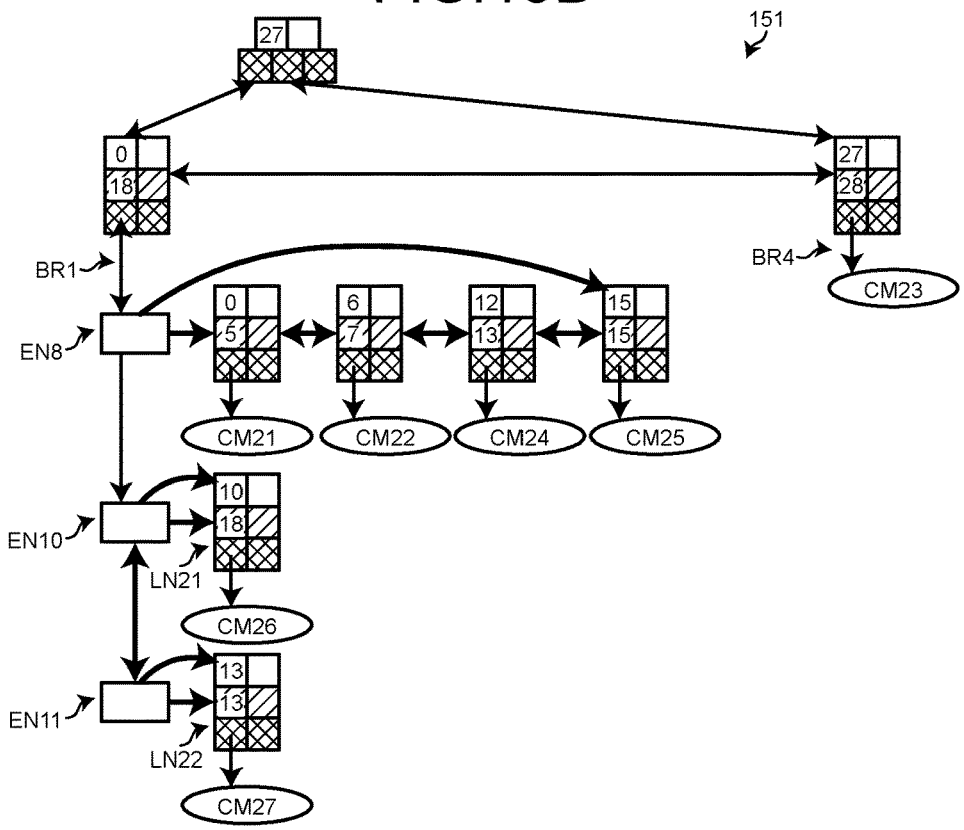
Figure 16:
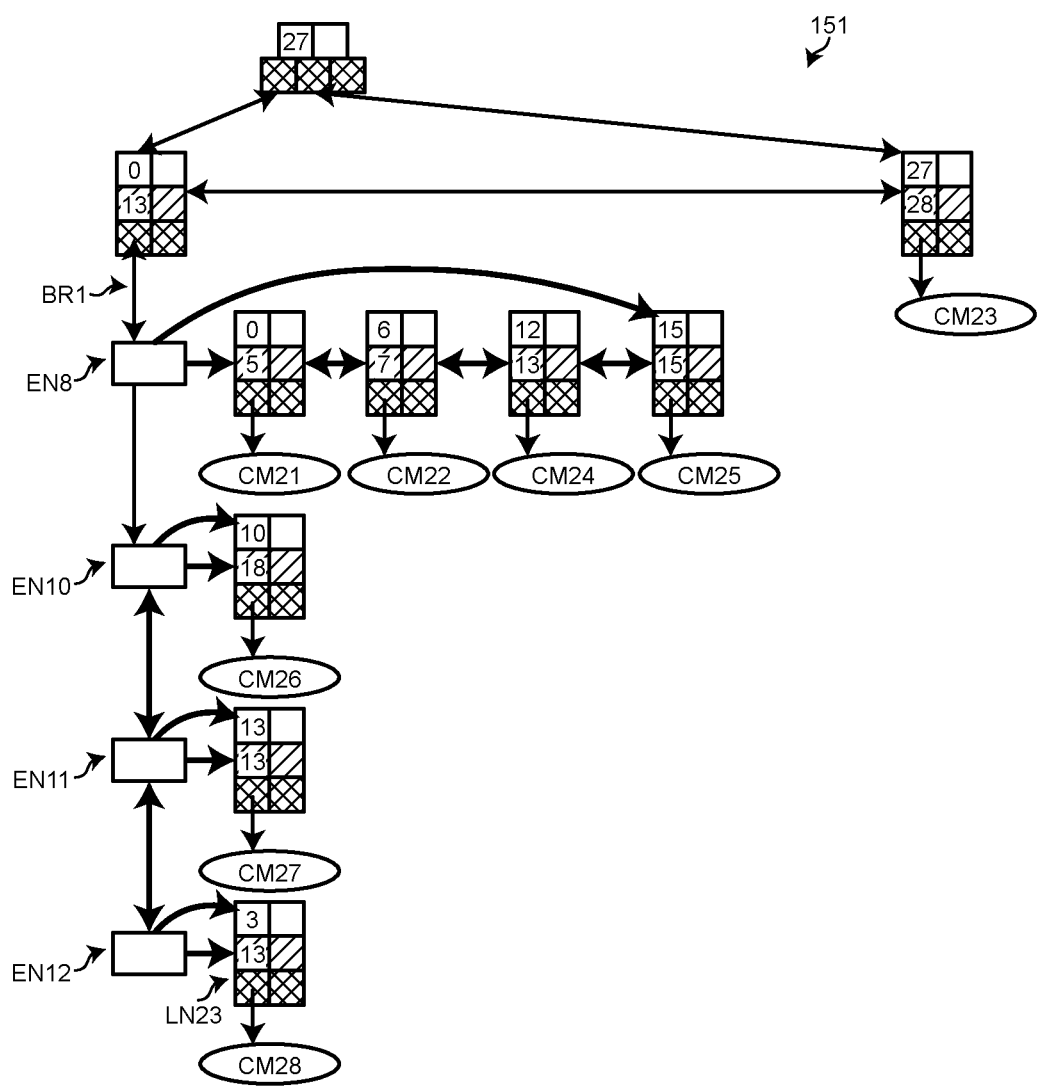
FIG. 16 is a diagram illustrating an operation of the database when a command is received according to the second modification of the embodiment.

In the database 151 illustrated in FIG. 15B, the address range of the branch BR1 is 0 to 18. The address range of the received command CM28 is 3 to 13. By the operation unit 10b2, there is no address range overlapping with than of the command CM28 with the address being larger than that in an address range of 0 to 18. The operation unit 10b2 determines that there is no address larger than the address of the branch BR1 selected in S42 and having an address range overlapping with that of the address of the branch BR selected in S42 among the leaf nodes LN selected in S42 or leaf nodes LN adjacent thereto (No in S44).

The operation unit 10b2 newly connects an extension node EN12 on a side that is new in time series to the newest extension node EN11 among the extension nodes EN8, EN10, and EN11 managed by the branch BR1 selected in S42, and inserts the command CM28 of S41 (S53). The operation unit 10b2 connects the extension node EN12 in dependence on the extension node EN11, and connects the leaf node LN23 to the extension node EN12. The operation unit 10b2 associates the command CM28 with the leaf node LN23, and sets the address range of the leaf node LN23 to 3 to 13.

As described above, in the disk device 10, when a command is received, the controller 19 can add the received command CM to the database 151 while integrating and organizing extension nodes in the database 151.

As a third modification of the embodiment, the database 151 may be operated as illustrated in FIGS. 17A to 20 according to the operation of the disk device 10 illustrated in FIG. 13. FIGS. 17A, 17B, 18A, 18B, 19A, 19B, and 20 are diagrams each illustrating an operation of a database when a command is received.

Figure 17A:
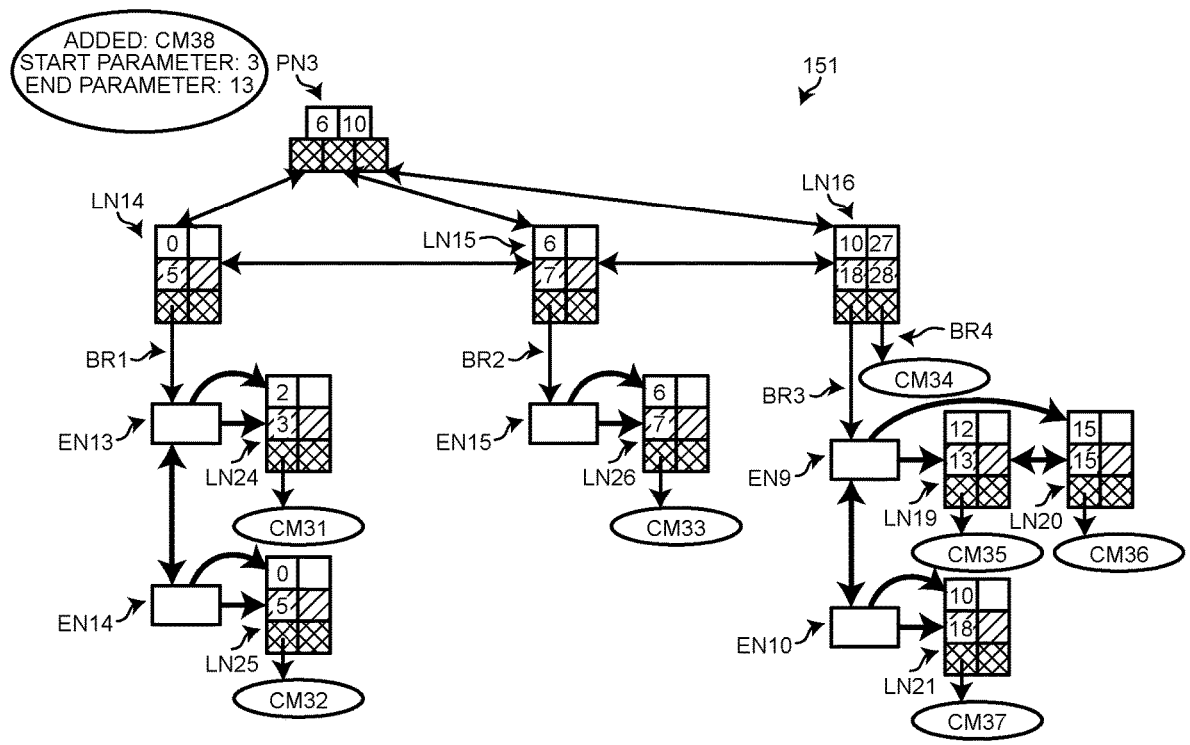
FIGS. 17A and 17B are diagrams illustrating an operation of the database when a command is received according to a third modification of the embodiment.

In the database 151 illustrated in FIG. 17A, three leaf nodes LN14, LN15, and LN16 depend on a parent node PN3, and accordingly, there are four branches BR1, BR2, BR3, and BR4.

When a command CM38 is received (Yes in S41), it is requested to add the command CM38. The command CM38 has an address range of 3 to 13, and the branch BR1 is a branch BR having the smallest address among the leaf nodes LN14, LN15, and LN16 having address ranges overlapping with that of the command CM38. Extension nodes EN13 and EN14 depend on the branch BR1. The operation unit 10b2 determines that the branch BR1 having the smallest address has extension nodes EN13 and EN14 (Yes in S42).

The address range of the branch BR1 is 0 to 5. The leaf node LN26 has an address range of 6 to 7, which overlaps with that of the command CM38 with the address being larger than that in an address range of 0 to 5. The operation unit 10b2 determines that there is an address larger than the address of the branch BR selected in S42 and having an address range overlapping with that of the address of the branch BR selected in S42 among the leaf nodes LN selected in S42 or leaf nodes LN adjacent thereto (Yes in S44).

In the database 151 illustrated in FIG. 17A, no command CM depends on the branch BR2. The operation unit 10b2 determines that a branch BRn (=BR2) having a larger address than the branch BR selected in S42 among the leaf nodes LN selected in S42 or the leaf nodes LN adjacent thereto does not have the command CM (No in S45).

The operation unit 10b2 sets 1 to k as an initial value.

In the database 151 illustrated in FIG. 17A, an extension node EN15 depends on the branch BR2. The operation unit 10b2 determines that the branch BRn (=BR2) having a larger address than the branch BR selected in S42 has the extension node EN15 (Yes in S47).

The operation unit 10b2 moves and connects a leaf node LN26 that the oldest extension node EN15 among the extension node EN15 managed by the branch BRn (=BR2) has, together with a command CM33, to a kth (=first) oldest extension node EN13 among the extension nodes EN13 and EN14 managed by the branch BR1 selected in S42, and deletes the extension node EN15 that does not have the leaf node LN26 after it is moved (S48). Accordingly, the operation unit 10b2 changes the address range of the leaf node LN14 to 0 to 7. The database 151 is in a state illustrated in FIG. 17B.

Figure 17B:
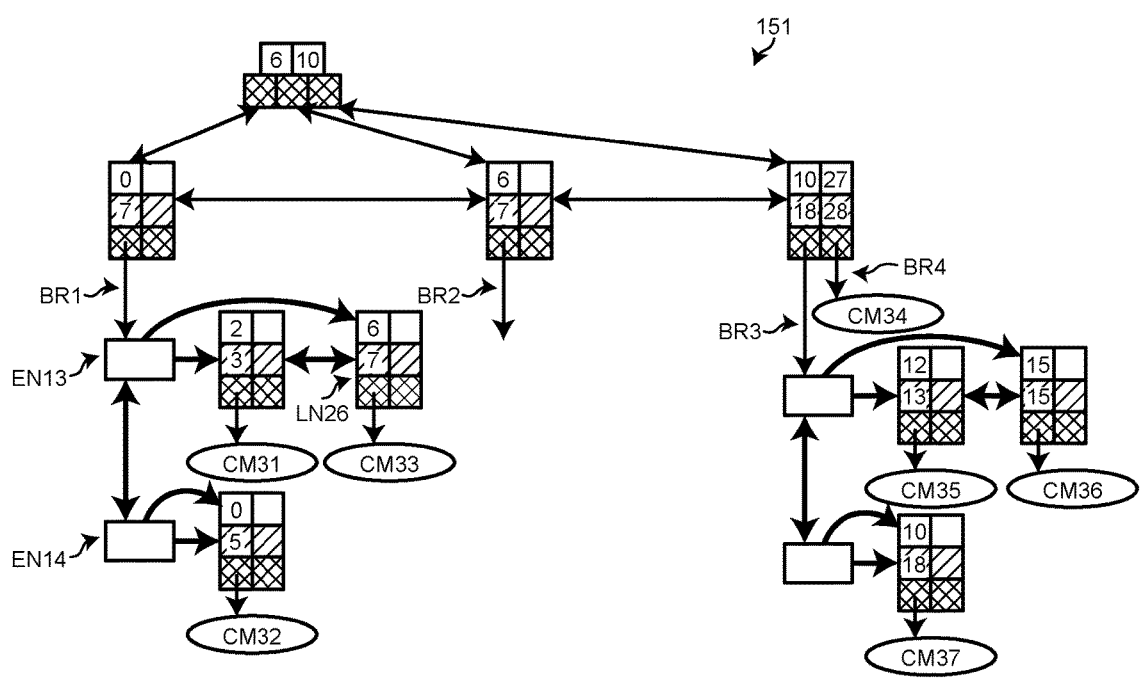

In the database 151 illustrated in FIG. 17B, the branch BR1 has a next oldest extension node EN14 after the extension node EN13. The operation unit 10b2 determines that there is a k+1th (=second) oldest extension node EN14 with respect to the extension nodes EN that the branch BR1 selected in S42 has (Yes in S49).

The operation unit 10b2 increments k to set k=2.

In the database 151 illustrated in FIG. 17B, no extension node EN depends on the branch BR2. The operation unit 10b2 determines that the branch BRn (=BR2) having a larger address than the branch BR selected in S42 does not have an extension node EN (No in S47).

Since the branch BRn (=BR2) has neither the command CM nor the extension node EN, the operation unit 10b2 deletes the branch BRn (=BR2) (S52). As a result, the database 151 is in a state illustrated in FIG. 18A.

The operation unit 10b2 increments n to set n=3.

The address range of the branch BR1 is 0 to 7. The leaf node LN21 has an address range of 10 to 18, which overlaps with that of the command CM38 with the address being larger than that in an address range of 0 to 7. The operation unit 10b2 determines that there is an address larger than the address of the branch BR selected in S42 and having an address range overlapping with that of the address of the branch BR selected in S42 among the leaf nodes LN selected in S42 or leaf nodes LN adjacent thereto (Yes in S44).

Figure 18A:
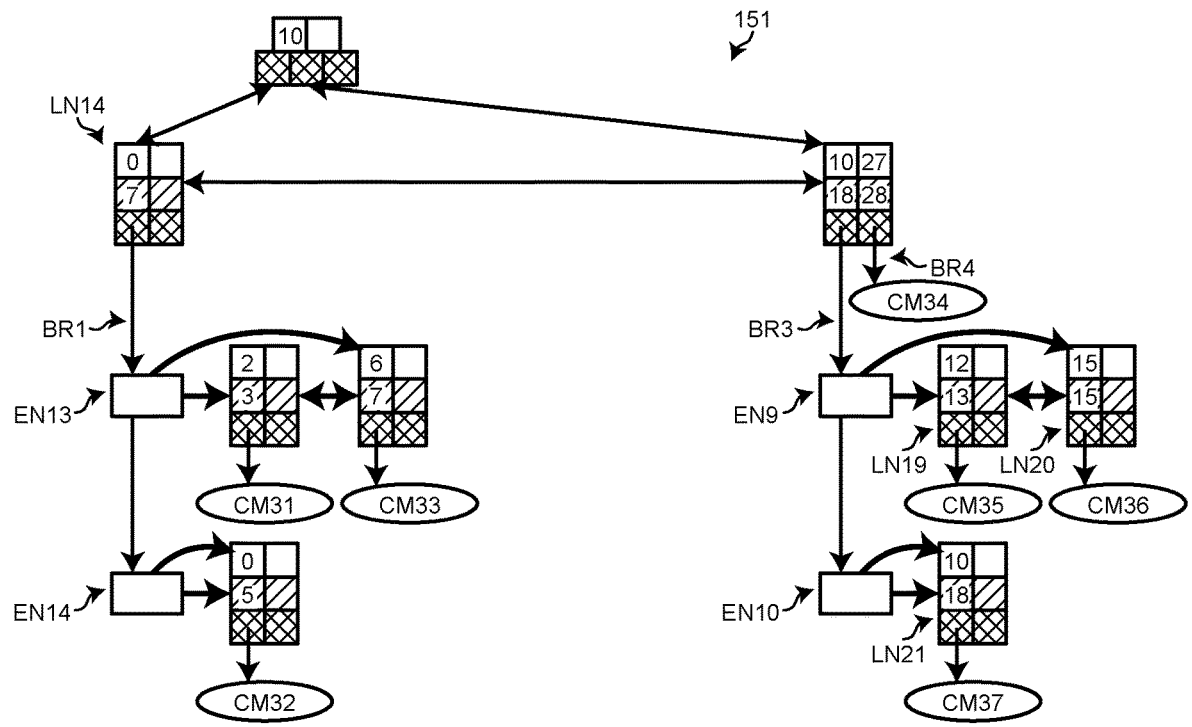
FIGS. 18A and 18B are diagrams illustrating an operation of the database when a command is received according to the third modification of the embodiment.

In the database 151 illustrated in FIG. 18A, no command CM depends on the branch BR3. The operation unit 10b2 determines that the branch BRn (=BR3) having a larger address than the branch BR selected in S42 among the leaf nodes LN selected in S42 or the leaf nodes LN adjacent thereto does not have the command CM (No in S45). The operation unit 10b2 sets 1 to k as an initial value.

In the database 151 illustrated in FIG. 18A, extension nodes EN9 and EN10 depends on the branch BR3. The operation unit 10b2 determines that the branch BRn (=BR3) having a larger address than the branch BR selected in S42 has extension nodes EN9 and EN10 (Yes in S47).

The operation unit 10b2 moves and connects the leaf nodes LN19 and LN20 that the oldest extension node EN9 among the extension nodes EN9 and EN10 managed by the branch BRn (=BR3) has, together with the commands CM35 and CM36, to the kth (=first) oldest extension node EN13 among the extension nodes EN13 and EN14 managed by the branch BR1 selected in S42, and deletes the extension node EN9 that does not have the leaf nodes LN19 and LN20 after they are moved (S48). Accordingly, the operation unit 10b2 changes the address range of the leaf node LN14 to 0 to 15. The database 151 is in a state illustrated in FIG. 18B.

Figure 18B:
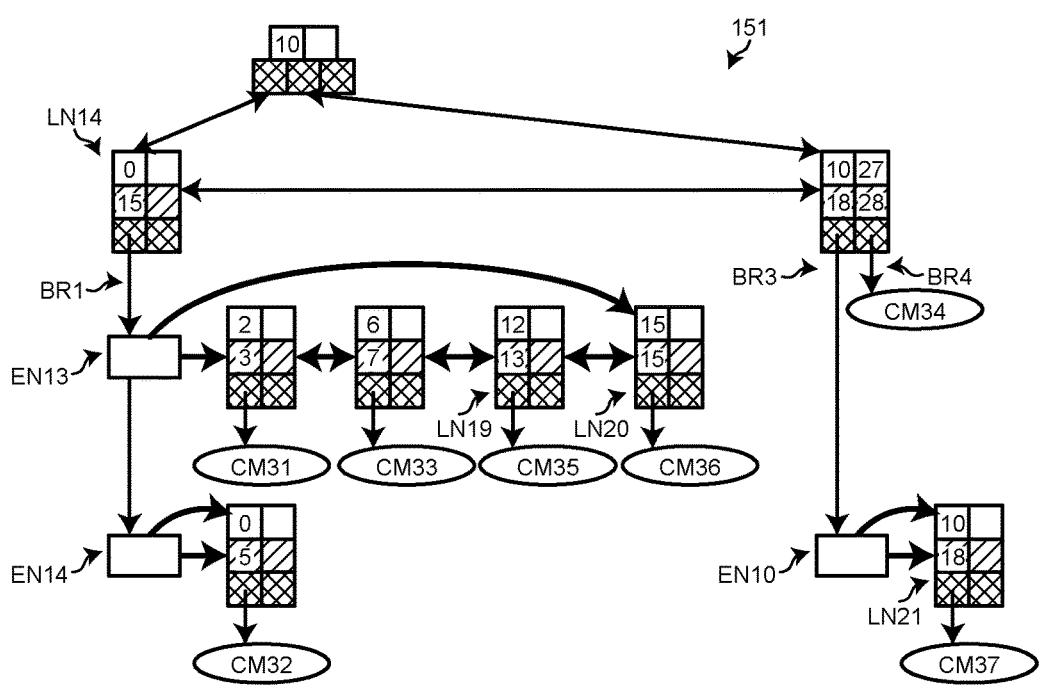

In the database 151 illustrated in FIG. 18B, the branch BR1 has a next oldest extension node EN14 after the extension node EN13. The operation unit 10b2 determines that there is a k+1th (=second) oldest extension node EN14 with respect to the extension nodes EN that the branch BR1 selected in S42 has (Yes in S49).

The operation unit 10b2 increments k to set k=2.

In the database 151 illustrated in FIG. 18B, the extension node EN10 depends on the branch BR3. The operation unit 10*b*2 determines that the branch BRn (=BR3) having a larger address than the branch BR selected in S42 has the extension node EN10 (Yes in S47).

The operation unit 10*b*2 moves and connects a leaf node LN21 that the oldest extension node EN10 among the extension node EN10 managed by the branch BRn (=BR3) has, together with a command CM37, to a kth (=second) oldest extension node EN14 among the extension nodes EN13 and EN14 managed by the branch BR1 selected in S42, and deletes the extension node EN10 that does not have the leaf node LN21 after it is moved (S48). Accordingly, the operation unit 10*b*2 changes the address range of the leaf node LN14 to 0 to 18. The database 151 is in a state illustrated in FIG. 19A.

Figure 19A:
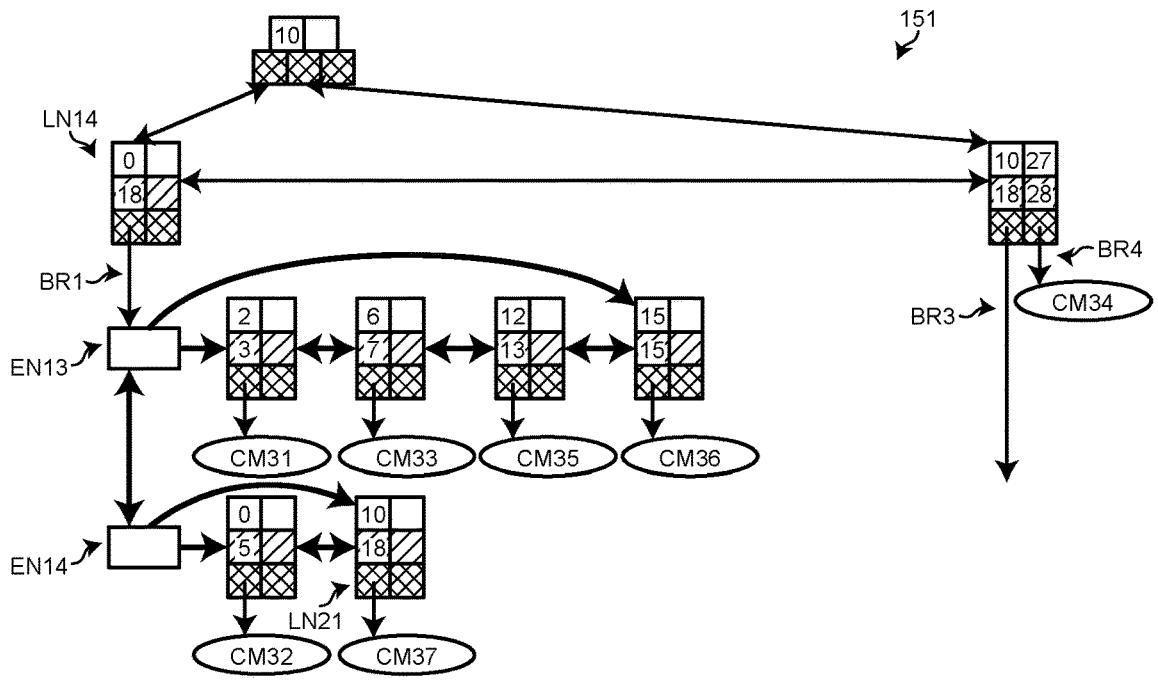
FIGS. 19A and 19B are diagrams illustrating an operation of the database when a command is received according to the third modification of the embodiment.

In the database 151 illustrated in FIG. 19A, an extension node EN does not depend on the branch BR3. The operation unit 10*b*2 determines that the branch BRn (=BR3) has no extension node EN (No in S50).

Since the branch BRn (=BR3) has neither the command CM nor the extension node EN, the operation unit 10*b*2 deletes the branch BRn (=BR3) (S52). As a result, the database 151 is in a state illustrated in FIG. 19B.

The operation unit 10*b*2 increments n to set n=4.

Figure 19B:
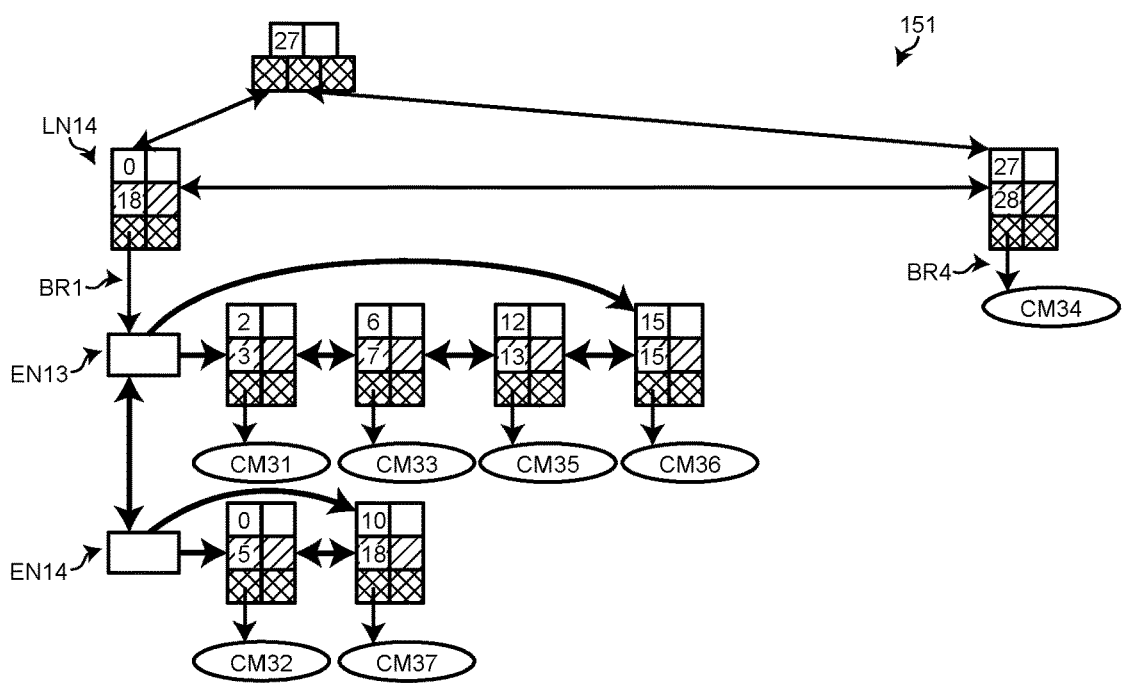
Figure 20:
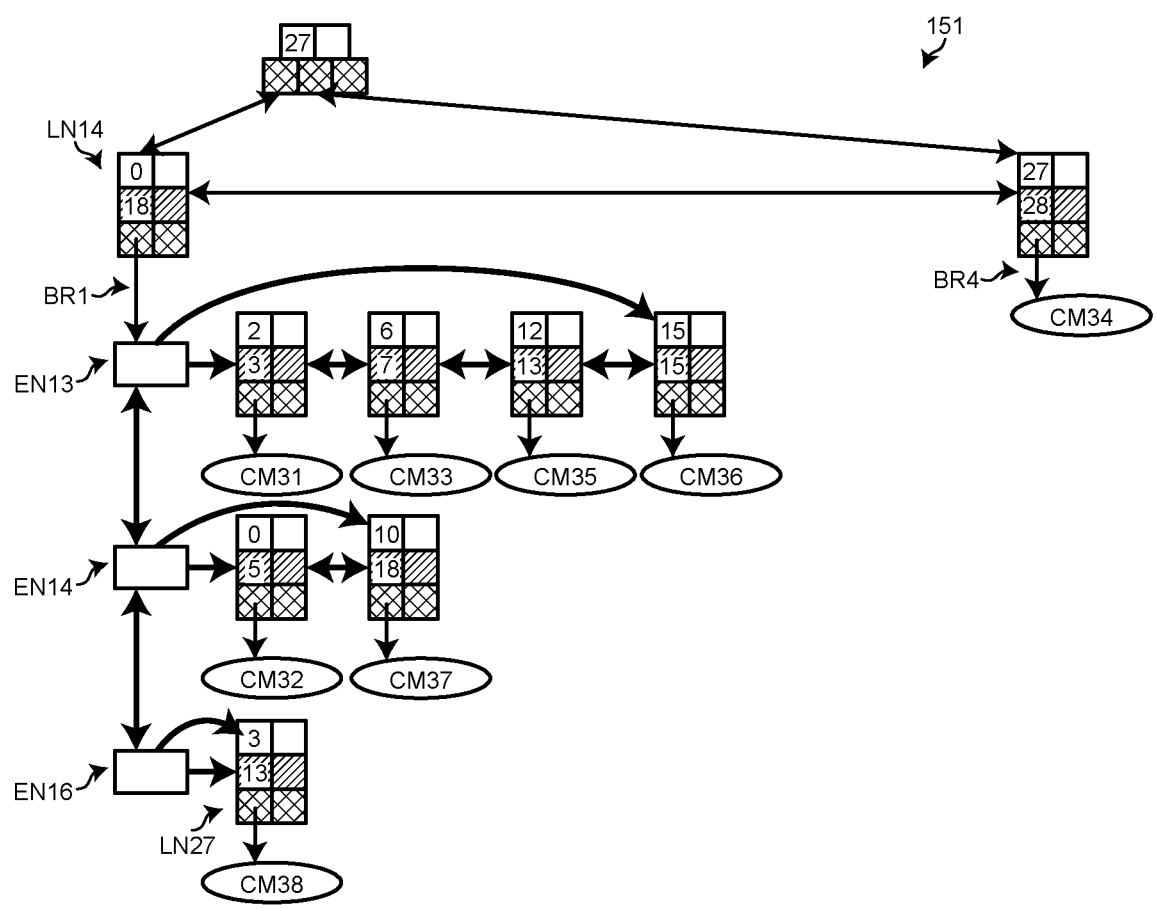
FIG. 20 is a diagram illustrating an operation of the database when a command is received according to the third modification of the embodiment.

In the database 151 illustrated in FIG. 19B, the address range of the branch BR1 is 0 to 18. The address range of the received command CM38 is 3 to 13. By the operation unit 10*b*2, there is no address range overlapping with than of the command CM38 with the address being larger than that in an address range of 0 to 18. The operation unit 10*b*2 determines that there is no address larger than the address of the branch BR1 selected in S42 and having an address range overlapping with that of the address of the branch BR selected in S42 among the leaf nodes LN selected in S42 or leaf nodes LN adjacent thereto (No in S44).

The operation unit 10*b*2 newly connects an extension node EN16 on a side that is new in time series to the newest extension node EN14 among the extension nodes EN13 and EN14 managed by the branch BR1 selected in S42, and inserts the command CM38 of S41 (S53). The operation unit 10*b*2 connects the extension node EN16 in dependence on the extension node EN14, and connects a leaf node LN27 to the extension node EN16. The operation unit 10*b*2 associates the command CM38 with the leaf node LN27, and sets the address range of the leaf node LN27 to 3 to 13. As a result, the database 151 is in a state illustrated in FIG. 20.

As described above, in the disk device 10, when a command is received, the controller 19 can add the received command CM to the database 151 while integrating and organizing extension nodes in the database 151.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A disk device comprising:
  a disk medium on which data is recorded according to an address;
  a memory; and
  a controller that generates or updates a database and stores the database in the memory as a command including the address is received, wherein
  the database is associated with address ranges of commands, and includes a tree-like array in accordance with command addresses and time series, and
  the controller manages commands using the database.

2. The disk device according to claim 1, wherein
  the database includes a function of handling key ranges and a function of handling time series of nodes.

3. The disk device according to claim 2, wherein
  extension nodes depending on a leaf node are hierarchically added to the database.

4. The disk device according to claim 3, wherein
  leaf nodes depending on the extension nodes are added to the database.

5. The disk device according to claim 1, wherein
  the database includes
  a first leaf node associated with two keys indicating an address range of a command.

6. The disk device according to claim 5, wherein
  the database further includes
  a second leaf node depending on the first leaf node and associated with two keys indicating an address range of a command.

7. The disk device according to claim 6, wherein
  the command included in the second leaf node is temporally newer than the command included in the first leaf node, and
  the address range indicated by the two keys of the first leaf node and the address range indicated by the two keys of the second leaf node depending on the first leaf node at least partially overlap with each other.

8. The disk device according to claim 5, wherein
  the database further includes a parent node associated with one key, and
  the first leaf node depends on the parent node.

9. The disk device according to claim 8, wherein
  the database further includes:
  a second leaf node depending on the first leaf node and associated with two keys indicating an address range of a command; and
  a third leaf node depending on the second leaf node and associated with two keys indicating an address range of a command.

10. The disk device according to claim 9, wherein
  the database further includes:
  a first extension node connecting the parent node and the first leaf node to each other;
  a second extension node connecting the first leaf node and the second leaf node to each other; and
  a third extension node connecting the second leaf node and the third leaf node to each other.

11. The disk device according to claim 8, wherein
  the database further includes
  a first extension node connecting the parent node and the first leaf node to each other.

12. The disk device according to claim 8, wherein
  the database further includes:
  a second leaf node depending on the first leaf node and associated with two keys indicating an address range of a command;
  a first extension node connecting the parent node and the first leaf node to each other; and
  a second extension node connecting the first leaf node and the second leaf node to each other.

13. The disk device according to claim 1, wherein
leaf nodes corresponding to an overlapping address range are connected to each other at a plurality of stages in the database.

14. The disk device according to claim 13, wherein
a lower stage is temporally newer than an upper stage at the plurality of stages.

15. A command management method comprising:
receiving a command including an address in a disk device including a disk medium on which data is recorded according to the address and a memory;
constructing or updating a database according to the received command and storing the database in the memory, the database being associated with address ranges of commands and including a tree-like array in accordance with command addresses and time series; and
managing commands using the database.

16. The command management method according to claim 15, wherein
the constructing or updating of the database includes
constructing or updating the database including a leaf node associated with two keys indicating an address range of a command.

17. The command management method according to claim 15, wherein
the constructing or updating of the database includes:
adding an extension node depending on the leaf node to the database; and
adding a leaf node depending on the extension node to the database.

18. The command management method according to claim 15, wherein
the managing of the commands includes
searching for a command in the database using two keys indicating an address range of the command.

19. The command management method according to claim 18, wherein
the managing of the commands further includes
searching for a plurality of commands having an overlapping address range in the database by using the two keys.

20. The command management method according to claim 19, wherein
the managing of the commands further includes
merging the plurality of commands having an overlapping address range in the database.

* * * * *